US012786791B2

(12) United States Patent
Sohi et al.

(10) Patent No.: US 12,786,791 B2
(45) Date of Patent: Nov. 3, 2026

(54) DYNAMIC ASSIGNMENT OF CELLS TO PODS

(71) Applicant: Boost SubscriberCo L.L.C., Englewood, CO (US)

(72) Inventors: Gurpreet Sohi, Parker, CO (US); Premchand Chandran, Brambleton, VA (US); Julio Roberto Armenta, Aldie, VA (US)

(73) Assignee: Boost SubscriberCo L.L.C., Englewood, CO (US)

( * ) Notice: Subject to any disclaimer, the term of this patent is extended or adjusted under 35 U.S.C. 154(b) by 311 days.

(21) Appl. No.: 18/436,930

(22) Filed: Feb. 8, 2024

(65) Prior Publication Data

US 2025/0261222 A1 Aug. 14, 2025

(51) Int. Cl.
*H04W 28/08* (2023.01)
*H04L 41/0893* (2022.01)
(Continued)

(52) U.S. Cl.
CPC ......... *H04W 28/08* (2013.01); *H04L 41/0893* (2013.01); *H04L 41/0894* (2022.05);
(Continued)

(58) Field of Classification Search
CPC ...... H04W 28/08–0992; H04L 41/0813–0836; H04L 41/0895–0897
See application file for complete search history.

(56) References Cited

U.S. PATENT DOCUMENTS 10,476,742 B1 * 11/2019 Szarvas ................. H04L 41/145
2014/0068075 A1 * 3/2014 Bonilla .................. G06Q 30/00 709/226

(Continued)

FOREIGN PATENT DOCUMENTS

WO 2022187796 A1 9/2022

OTHER PUBLICATIONS

PCT/US2025/014468 International Search Report and Written Opinion dated Apr. 23, 2025.

(Continued)

*Primary Examiner* — Brendan Y Higa
(74) *Attorney, Agent, or Firm* — Kilpatrick Townsend & Stockton LLP

(57) ABSTRACT

An apparatus comprises a memory and a processor communicatively coupled to one another. The memory may comprise information on network resources and one or more cell identifiers (IDs). The processor may be configured to determine whether the one or more network resources are unassigned, determine that the one or more network resources are available for allocation to the one or more cell IDs in response to determining that the one or more network resources are unassigned, divide the one or more network resources into first network resources and second network resources, assign the first network resources to first cell IDs, and assign the second network resources to second cell IDs. Further, the processor is configured to generate a first pod in the one or more containerized clusters comprising the first cell IDs and generate a second pod in the one or more containerized clusters comprising the second cell IDs.

14 Claims, 7 Drawing Sheets

(51) Int. Cl.
*H04L 41/0894* (2022.01)
*H04L 41/0895* (2022.01)
*H04W 16/00* (2009.01)
*H04W 24/02* (2009.01)

(52) U.S. Cl.
CPC ......... *H04L 41/0895* (2022.05); *H04W 16/00* (2013.01); *H04W 24/02* (2013.01)

(56) References Cited

U.S. PATENT DOCUMENTS

| | | | | |
|---|---|---|---|---|
| 2020/0389816 | A1* | 12/2020 | Desai | H04W 8/005 |
| 2021/0377801 | A1* | 12/2021 | Noriega | H04W 88/14 |
| 2022/0066827 | A1 | 3/2022 | Tavallaei et al. | |
| 2022/0278927 | A1 | 9/2022 | Mariappan et al. | |
| 2022/0329486 | A1* | 10/2022 | Nagaprakash | H04L 43/0811 |
| 2022/0334886 | A1 | 10/2022 | Vishwanath et al. | |
| 2023/0189077 | A1* | 6/2023 | Kwon | H04W 88/085<br>370/328 |
| 2023/0336440 | A1 | 10/2023 | Trujillo | |
| 2023/0403198 | A1* | 12/2023 | Cai | H04L 67/1031 |
| 2024/0007921 | A1* | 1/2024 | Seo | H04L 43/20 |
| 2024/0163727 | A1* | 5/2024 | Chamarty | H04W 28/18 |
| 2024/0314676 | A1* | 9/2024 | Raghavendra | H04W 24/02 |
| 2024/0365170 | A1* | 10/2024 | Taneja | H04W 28/0268 |
| 2025/0294412 | A1* | 9/2025 | Kim | H04W 36/38 |
| 2025/0307042 | A1* | 10/2025 | Atur | G06F 11/008 |
| 2025/0310202 | A1* | 10/2025 | Atur | H04L 41/0897 |

OTHER PUBLICATIONS

Julio Armenta, In Service Upgrade of Radio Access Network Radio Unit of a Cellular Network, U.S. Appl. No. 18/147,427, filed Dec. 28, 2022, pp. 1-41.

Julio Armenta, In Service Upgrade of Radio Access Network Distributed Unit of a Cellular Network, U.S. Appl. No. 18/147,407, filed Dec. 28, 2022, pp. 1-45.

Gurpreet Sohi, Dynamic Assignment of Network Resources to Resource Pools in Pods, U.S. Appl. No. 18/436,981, filed Feb. 8, 2024, pp. 1-59.

Gurpreet Sohi, Dynamic Assignment of Network Resources to Slices in Pods, U.S. Appl. No. 18/437,023, filed Feb. 8, 2024, pp. 1-59.

* cited by examiner

DYNAMIC ASSIGNMENT OF CELLS TO PODS

TECHNICAL FIELD

The present disclosure relates generally to assigning network resources in a communication system, and more specifically to a system and method to dynamically assigning cells to pods.

BACKGROUND

In some wireless communications systems, pods are deployed in a containerized environment. The pods are small deployable units of computing that are created and managed in the containerized environment. The pods may comprise one or more containers with shared storage and network resources. The shared storage and network resources may be co-located and co-scheduled. The network resources may be power resources, memory resources, and processing resources that are consumed in attempts to access services in a given wireless communication system. The network resources are wasted when the pods comprise more network resources than needed to access specific services in the given wireless communication system.

SUMMARY OF THE DISCLOSURE

Dynamic Assignment of Cells to Pods

In one or more embodiments, systems and methods disclosed herein dynamically assign cells to pod. In particular, the systems and methods may be configured to dynamically redistribute and/or reassign cells to pods. The systems and methods are configured to distribute, redistribute, assign, and/or reassign network resources corresponding to multiple cells into multiple pods. In some embodiments, the systems and methods analyze network resources available for different cells associated with a wireless communication system and assign these network resources to individual pods of equal or different size. The pods may be configured to be deployed in a containerized environment (e.g., Kubernetes environment). The pods may comprise network resources that are co-located and co-scheduled. The pods may be configured as redundancies of one another or as standalone portions of a wireless communication network. Herein, the systems and methods may be configured to dynamically assign the network resources during maintenance windows. Further, the systems and methods may be configured to dynamically assign the network resources outside of maintenance windows.

In one or more embodiments, the systems and methods described herein are integrated into a practical application of dynamically allocating cells to pods. In particular, the systems and methods may be configured to relocate and/or reassign network resources to specific pods during a maintenance window. The systems and methods may be configured to assign network resources of cells to pods of a same size. In this regard, a first number of cells in the first pod may be equal or different from a second number of cells in the second pod. In the systems and methods, while the first number of cells and the second number of cells may not be equal to one another, a first number of network resources comprising the first number of cells may be equal to a second number of network resources comprising the second number of cells. The network resources in the first pod and the network resources in the second pod may be shuffled between pods during maintenance window to utilize the network resources effectively and in symmetric manner. In other embodiments, the systems and methods are integrated into a practical application of relocating and/or reassigning network resources to specific pods outside the maintenance window. In this regard, the systems and methods may be configured to dynamically update the pods in by redistributing cells while the wireless communication system is online In addition, the system and method described herein are integrated into a technical advantage of increasing processing speeds in a computer system, because processors associated with the systems and methods prevent or eliminate waste of network resources. In particular, the systems and methods reduce memory usage and increase processing speed by dynamically assigning the cells to be used by the pods configured to enable access to specific services in the wireless communication system. Further, the systems and methods described herein provide a technical advantage of increasing processing speeds in a computer system, because processors associated with the systems and methods comprise a machine learning algorithm that actively generates insights based on usage of the cells in the pods. In some embodiments, the machine learning algorithm may provide the dynamic access commands based on some or all the insights obtained from the usage of the cells. As the machine learning algorithm is trained to account for many of the situations and conditions changing in the usage of the cells, multiple dynamic access commands are generated to relieve stress conditions in future processing operations (e.g., reduce and/or alleviate traffic) in the wireless communication system. In other embodiments, the systems and methods may be configured to generate real-time instructions to reassign and/or reallocate cells within existing and/or new pods. In this regard, resources may be saved in the user equipment by identifying new relevant operations to perform. The device resources may be power resources, memory resources, and processing resources that the user equipment saves by proactively and automatically determining a new immediate reassignments and/or reallocations to perform.

In one or more embodiments, the systems and methods may be performed by an apparatus, such as a server, communicatively coupled to multiple network components in a core network, one or more base stations in a radio access network, and one or more user equipment. Further, the systems may comprise a wireless communication system, which comprises the apparatus. In addition, the systems and methods may be performed as part of a process performed by the apparatus communicatively coupled to the network components in the core network. As a non-limiting example, the apparatus may comprise a memory and a processor communicatively coupled to one another. The memory may comprise information on one or more network resources configured for allocation in one or more containerized clusters and one or more cell identifiers (IDs). Each cell ID may correspond to at least one cell configured to be associated with at least one pod in the one or more containerized clusters. The processor may be configured to determine whether the one or more network resources are unassigned, determine that the one or more network resources are available for allocation to the one or more cell IDs in response to determining that the one or more network resources are unassigned, divide the one or more network resources into first network resources and second network resources, assign the first network resources to first cell IDs, and assign the second network resources to second cell IDs. Further, the processor is configured to generate a first pod in the one or more containerized clusters comprising the first cell IDs and generate a second pod in the one or more containerized clusters comprising the second cell IDs.

Dynamic Assignment of Network Resources to Resource Pools in Pods

In one or more embodiments, systems and methods disclosed herein dynamically assign network resources to resource pools in pods. In particular, the systems and methods may be configured to dynamically assign network resources to resource pools in pods associated with a cloud radio access network (CRAN). The systems and methods are configured to dynamically redistribute and/or reassign network resources to resource pools. In some embodiments, the systems and methods leverage cell redistribution into generating resource pools for physical layer applications in the CRAN. The pods may be configured to be deployed in a containerized environment (e.g., Kubernetes environment). The pods may comprise network resources that are co-located and co-scheduled. The pods may be configured as redundancies of one another or as standalone portions of a wireless communication network. Herein, the pods may be created and/or resized to enable Layer 1 (L1) operations and Layer 2 (L2) operations. The systems and methods may be configured to maintain a pool of floating resources for each layer. In this regard, the systems and methods may be configured to create and maintain an L1 resource pool, an L2 resource pool, and a floating resource pool to enable L1 operations and L2 operations. During off-peak hours, the systems and methods may be configured to monitor utilization of the L1 resource pool, the L2 resource pool, and the floating resource pool and determining whether to resize the resource pools to optimize usage of the network resources.

In one or more embodiments, the systems and methods are incorporated into the practical applications of (1) resizing of the pods and (2) improving CRAN multi-pool uses. In particular, the systems and methods may be configured to relocate and/or reassign network resources to the resource pools during a maintenance window or outside a maintenance window. The systems and methods may be configured to assign network resources to resource pools in pods of a same size or different sizes. The pods may comprise different sizes configured to support enterprise use cases at each resource pool. In some embodiments, the systems and methods are integrated in the practical application of reserving computing capacity in the pods managing a set of cells and keep some computing capacity in a resource pool in a floating mode. The resource pools may be scaled vertically and/or horizontally to support higher capacity during enterprise operations, mission critical operations in an organization, strict SLA use cases, and the like. In other embodiments, the systems and methods may be incorporated in multi-tenancy operations supported on a same wireless communication system running analytics/multi-access edge computing (MEC) applications during off peak hours on the wireless communication network. In yet more embodiments, the systems and methods may be configured to perform energy savings at CRAN sites. Herein, the systems and methods incorporate the practical application of managing L1 operations and L2 operations by different sets of cells located in different pods. Further, The systems and methods are incorporated in the practical application of performing downlink (DL) operations and uplink (UL) operations (e.g., processing). The DL operations and the UL operations may be assigned to individual dedicated cores and/or across multiple cores. For CRAN configuration, the systems and methods may be configured to create separate resource pools to perform L1 operations and L2 operations for individual sets of cells spanning across bigger sets of cells/cell sites. During off peak hours, the systems and methods are configured to monitor utilization of the L1 resource pools and the L2 resource pools. The systems and methods may be configured to shrink and/or expand footprints to optimize network resource consumption. The systems and methods may be configured to scale the L1 resource pools and L2 resource pools vertically and/or horizontally to improve utilization during peak times. Further, the systems and methods may be configured to implement handover operations to move user equipment connectivity to other cells, as long as quality of service is not compromised, to reduce the footprint of computing required.

In addition, the system and method described herein are integrated into a technical advantage of increasing processing speeds in a computer system, because processors associated with the systems and methods prevent or eliminate waste of network resources. In particular, the systems and methods reduce memory usage and increase processing speed by dynamically assigning the network resources in resource pools configured to enable access to specific services in the wireless communication system. Further, the systems and methods described herein provide a technical advantage of increasing processing speeds in a computer system, because processors associated with the systems and methods comprise a machine learning algorithm that actively generates insights based on usage of the network resources in the pods. In some embodiments, the machine learning algorithm may provide the dynamic access commands based on some or all the insights obtained from the usage of the network resources in the resource pools. As the machine learning algorithm is trained to account for many of the situations and conditions changing in the usage of the network resources in the resource pools, multiple dynamic access commands are generated to relieve stress conditions in future processing operations (e.g., reduce and/or alleviate traffic) in the wireless communication system. In other embodiments, the systems and methods may be configured to generate real-time instructions to reassign and/or reallocate network resources within existing and/or new resource pools in existing and/or new pods. In this regard, resources may be saved in the user equipment by identifying new relevant operations to perform. The device resources may be power resources, memory resources, and processing resources that the user equipment saves by proactively and automatically determining a new immediate reassignments and/or reallocations to perform.

In one or more embodiments, the systems and methods may be performed by an apparatus, such as a server, communicatively coupled to multiple network components in a core network, one or more base stations in a radio access network, and one or more user equipment. Further, the systems may comprise a wireless communication system, which comprises the apparatus. In addition, the systems and methods may be performed as part of a process performed by the apparatus communicatively coupled to the network components in the core network. As a non-limiting example, the apparatus may comprise a memory and a processor communicatively coupled to one another. The memory may comprise information on one or more network resources configured for allocation in one or more containerized clusters. The processor may be configured to determine whether the one or more network resources are unassigned, determine that the one or more network resources are available for allocation to a first resource pool and a second resource pool in response to determining that the one or more network resources are unassigned, determine first network resources of the one or more network resources configured to enable first layer operations, and determine second network resources of the one or more network resources configured to enable second layer operations. Further, the processor may be configured to assign the first network resources to the first resource pool, assign the second network resources to the second resource pool, generate a first pod in the one or more containerized clusters comprising the first resource pool, and generate a second pod in the one or more containerized clusters comprising the second resource pool.

Dynamic Assignment of Network Resources to Slices in Pods

In one or more embodiments, systems and methods disclosed herein dynamically assign network resources to slices in pods. In particular, the systems and methods may be configured to dynamically assign network resources to slices in pods associated with a platform and infrastructure layer. The systems and methods are configured to dynamically redistribute and/or reassign network resources to network slices. In some embodiments, the systems and methods dynamically allocate network resources into network slices in accordance with one or more configuration parameters that may include: Service Level Agreement (SLA) considerations, general organization rules and policies, or emergency procedures. The slices may be configured as quick access to the network resources in individual pods. The network resources may be accessed without interfering with a rest of operations in a wireless communication network. Herein, the network resources may be accessed to experience higher priority and Quality of Service (QoS).

In one or more embodiments, the systems and methods are incorporated into the practical applications of (1) resizing of the pods and (2) improving slicing operations. In particular, the systems and methods may be configured to relocate and/or reassign network resources to the slices during a maintenance window or outside a maintenance window. The systems and methods may be configured to assign network resources to slices in pods of a same size or different sizes. The pods may comprise different sizes configured to support enterprise use cases at each slice. In some embodiments, the systems and methods are integrated in the practical application of reserving computing capacity in the pods managing a set of cells and keep some computing capacity in a slice in a floating mode. The slices may be scaled vertically and/or horizontally to support higher capacity during enterprise operations, mission critical operations in an organization, strict SLA use cases, and the like. In other embodiments, the systems and methods may be configured to perform multi-tenancy operations supported on a same wireless communication system running analytics/MEC applications during off peak hours on the wireless communication network. In yet other embodiments, the systems and methods are configured to enable access of network resources in slices at a platform and infrastructure layer. Herein, the network resources may be allocated to slice infrastructure and platform resources for high priority services to provide better QoS.

In addition, the system and method described herein are integrated into a technical advantage of increasing processing speeds in a computer system, because processors associated with the systems and methods prevent or eliminate waste of network resources. In particular, the systems and methods reduce memory usage and increase processing speed by dynamically assigning the network resources in slices configured to enable access to specific services in the wireless communication system. Further, the systems and methods described herein provide a technical advantage of increasing processing speeds in a computer system, because processors associated with the systems and methods comprise a machine learning algorithm that actively generates insights based on usage of the network resources in the pods. In some embodiments, the machine learning algorithm may provide the dynamic access commands based on some or all the insights obtained from the usage of the network resources in the slices. As the machine learning algorithm is trained to account for many of the situations and conditions changing in the usage of the network resources in the slices, multiple dynamic access commands are generated to relieve stress conditions in future processing operations (e.g., reduce and/or alleviate traffic) in the wireless communication system. In other embodiments, the systems and methods may be configured to generate real-time instructions to reassign and/or reallocate network resources within existing and/or new slices in existing and/or new pods. In this regard, resources may be saved in the user equipment by identifying new relevant operations to perform. The device resources may be power resources, memory resources, and processing resources that the user equipment saves by proactively and automatically determining a new immediate reassignments and/or reallocations to perform.

In one or more embodiments, the systems and methods may be performed by an apparatus, such as a server, communicatively coupled to multiple network components in a core network, one or more base stations in a radio access network, and one or more user equipment. Further, the systems may comprise a wireless communication system, which comprises the apparatus. In addition, the systems and methods may be performed as part of a process performed by the apparatus communicatively coupled to the network components in the core network. As a non-limiting example, the apparatus may comprise a memory and a processor communicatively coupled to one another. The memory may comprise information on one or more network resources available for allocation in one or more containerized clusters and one or more slice group identifiers (IDs). Each slice group ID may correspond to at least one slice group configured to be associated with at least one pod in the one or more containerized clusters. The processor may be configured to determine whether the one or more network resources are unassigned, determine that the one or more network resources are available for allocation to first resource pools and second resource pools in response to determining that the one or more network resources are unassigned, assign first network resources to the first resource pools, and assign second network resources to the second resource pools. Further, the processor may be configured to generate a first pod in the one or more containerized clusters comprising the first resource pools, generate a second pod in the one or more containerized clusters comprising the second resource pools, assign a first slice group ID of the one or more slice group IDs to the first pod and assign a second slice group ID of the one or more slice group IDs to the second pod. The first slice group ID may be configured to access at least one slice of the first resource pools in the first pod. The second slice group ID may be configured to access at least one slice of the second resource pools in the second pod.

Certain embodiments of this disclosure may comprise some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
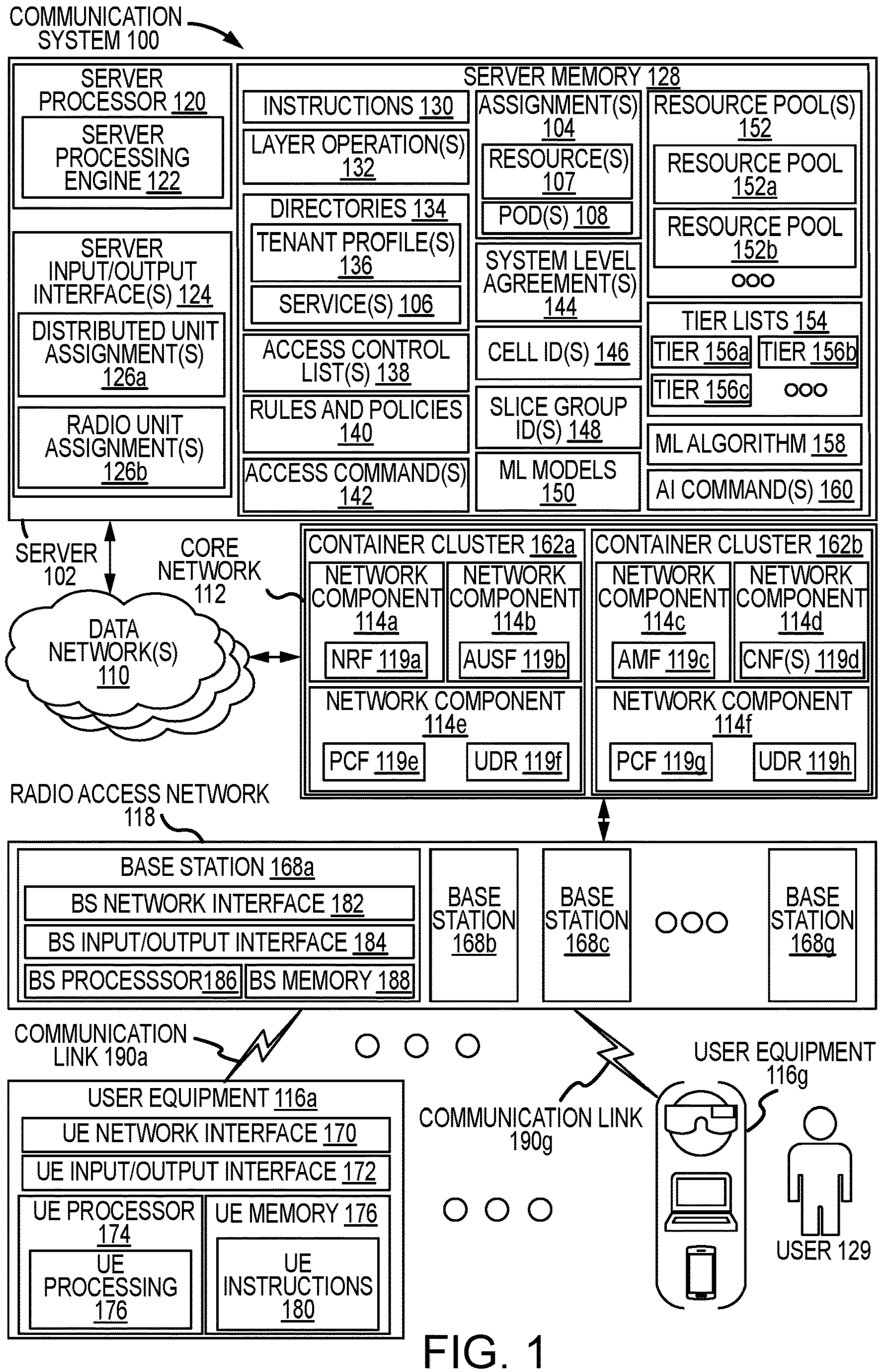
FIG. 1 illustrates an example communication system, in accordance with one or more embodiments.
Figure 2A:
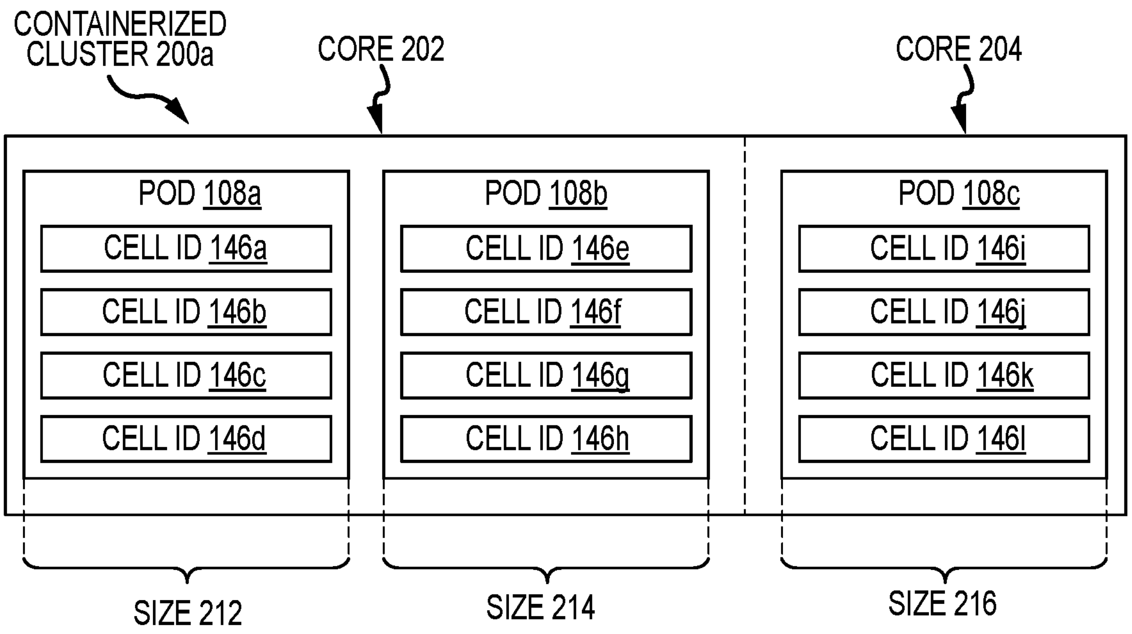
FIGS. 2A and 2B illustrate examples of containerized clusters implemented in the communication system of FIG. 1, in accordance with one or more embodiments.
Figure 2B:
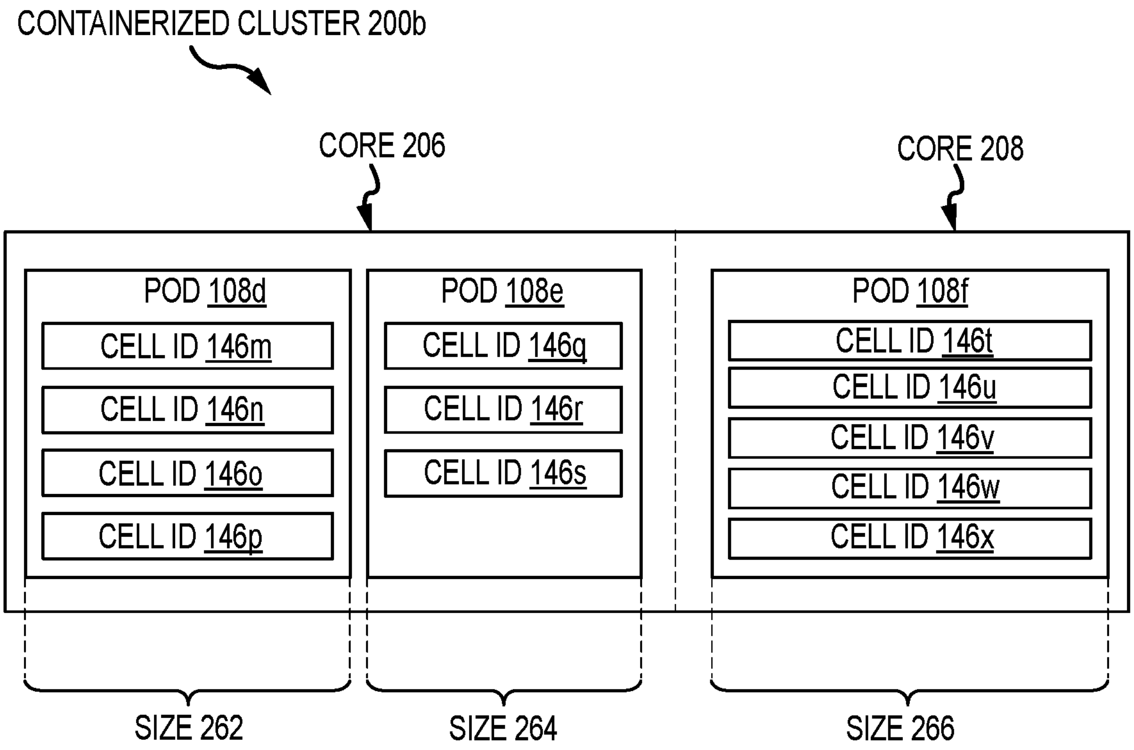
Figure 3:
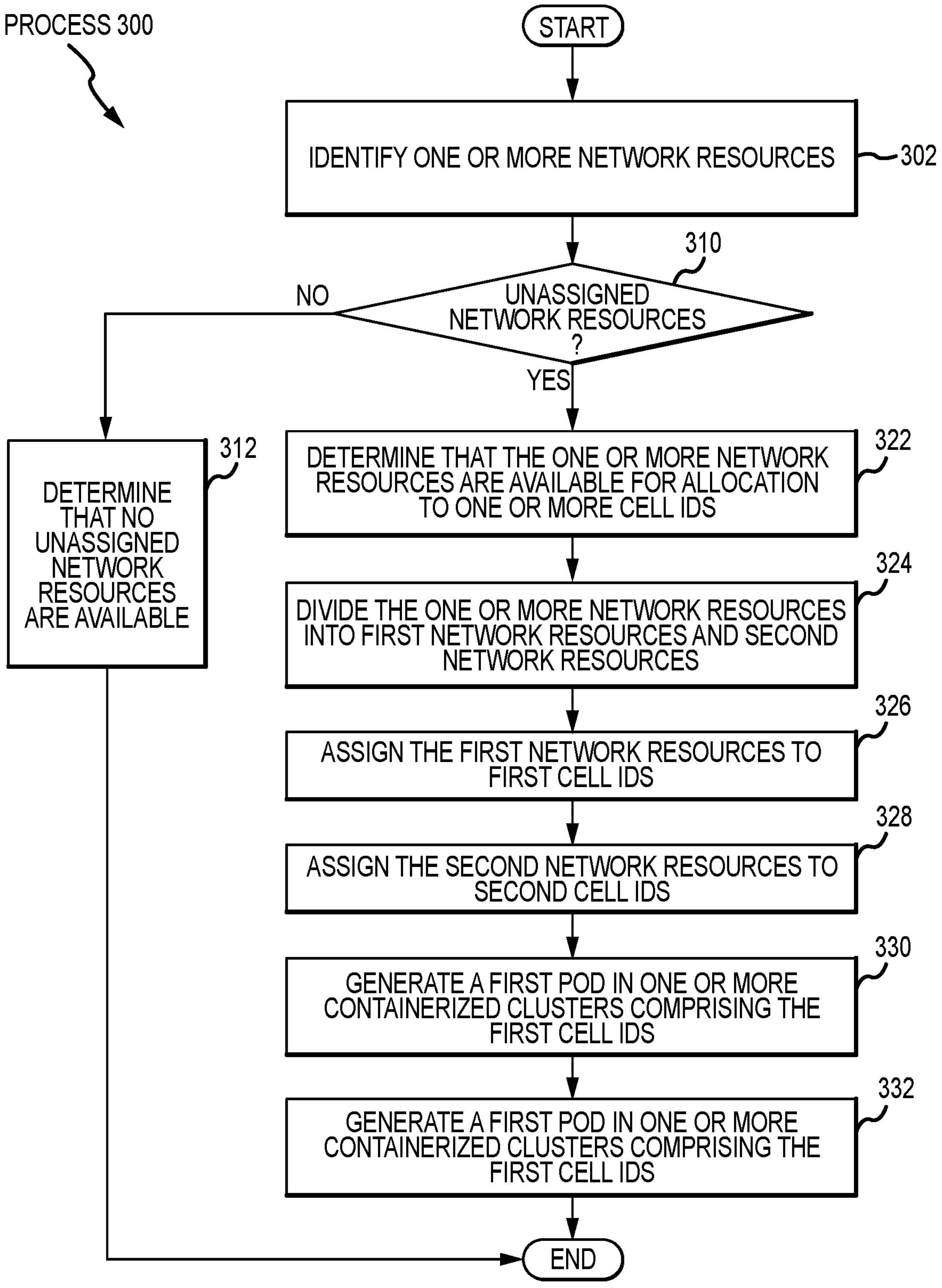
FIG. 3 illustrates an example flowchart of a method to dynamically assign cells to pod, in accordance with one or more embodiments.
Figure 4A:
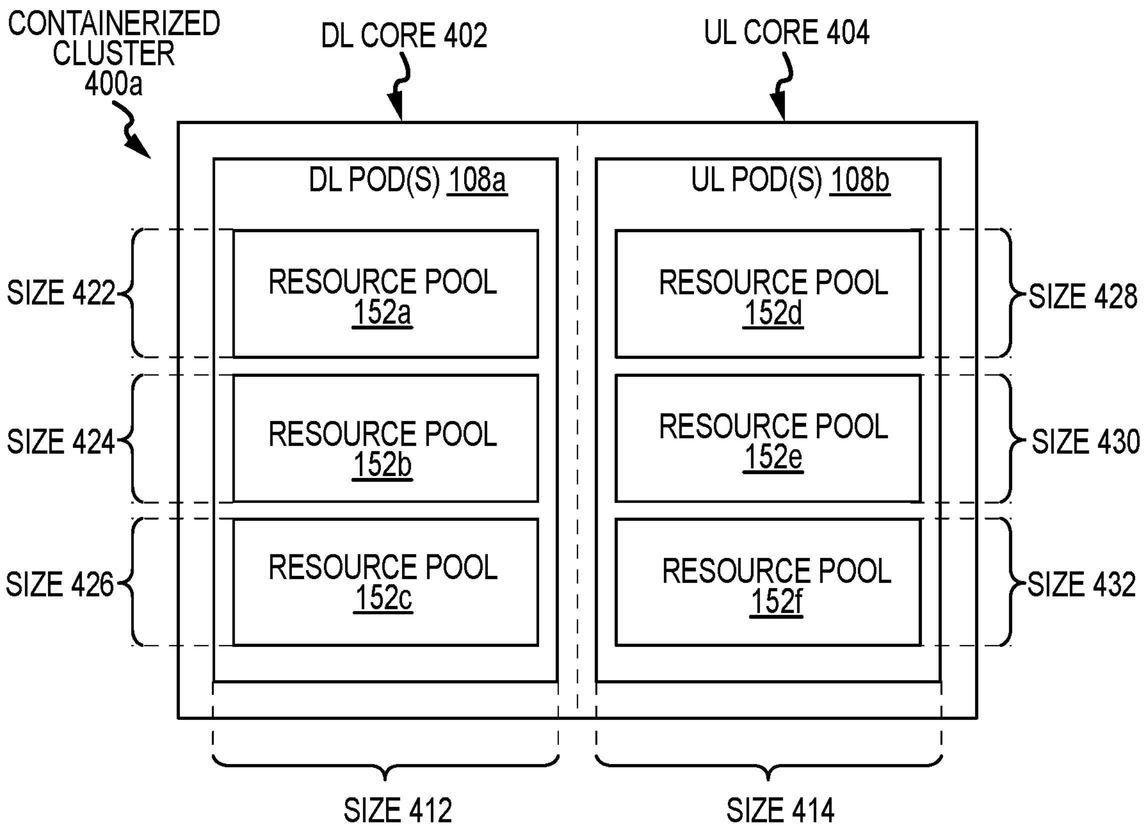
FIGS. 4A and 4B illustrate examples of containerized clusters implemented in the communication system of FIG. 1, in accordance with one or more embodiments.
Figure 4B:
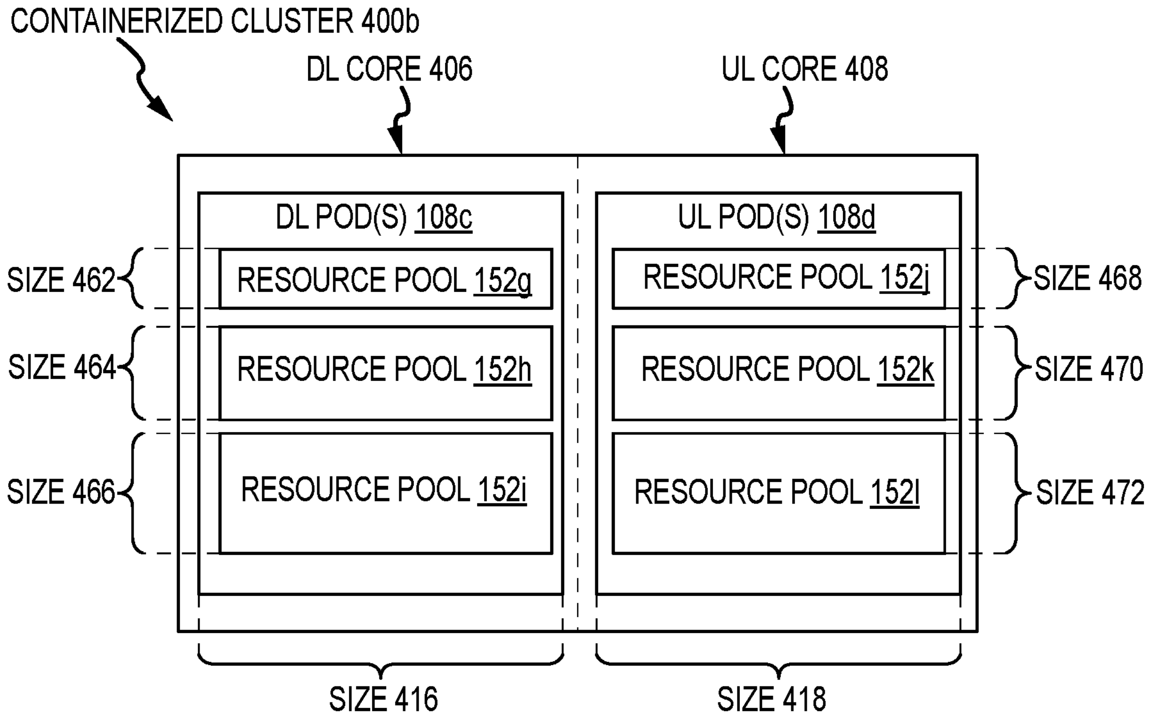
Figure 5:
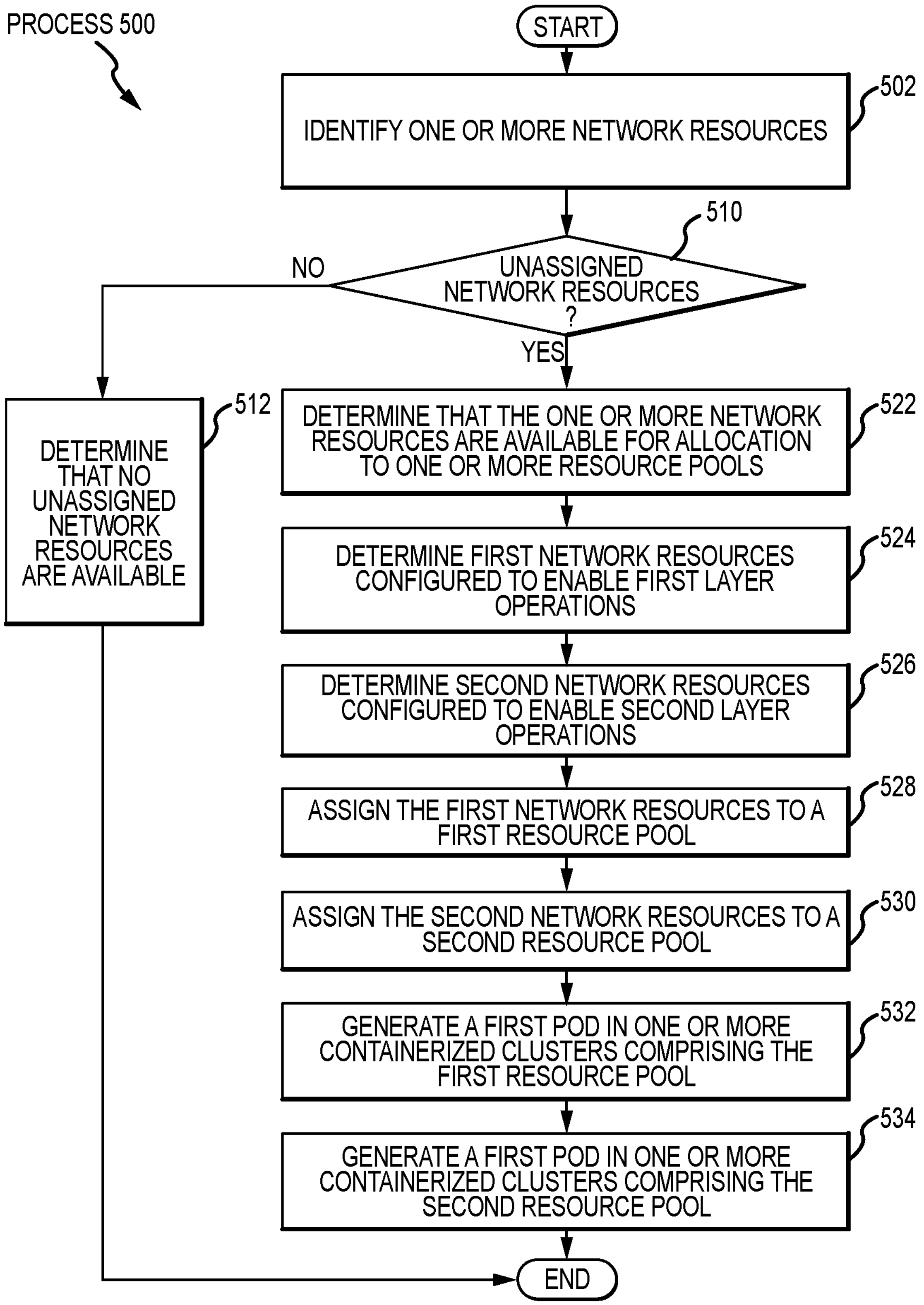
FIG. 5 illustrates an example flowchart of a method to dynamically assign network resources to resource pools in pods, in accordance with one or more embodiments.
Figure 6:
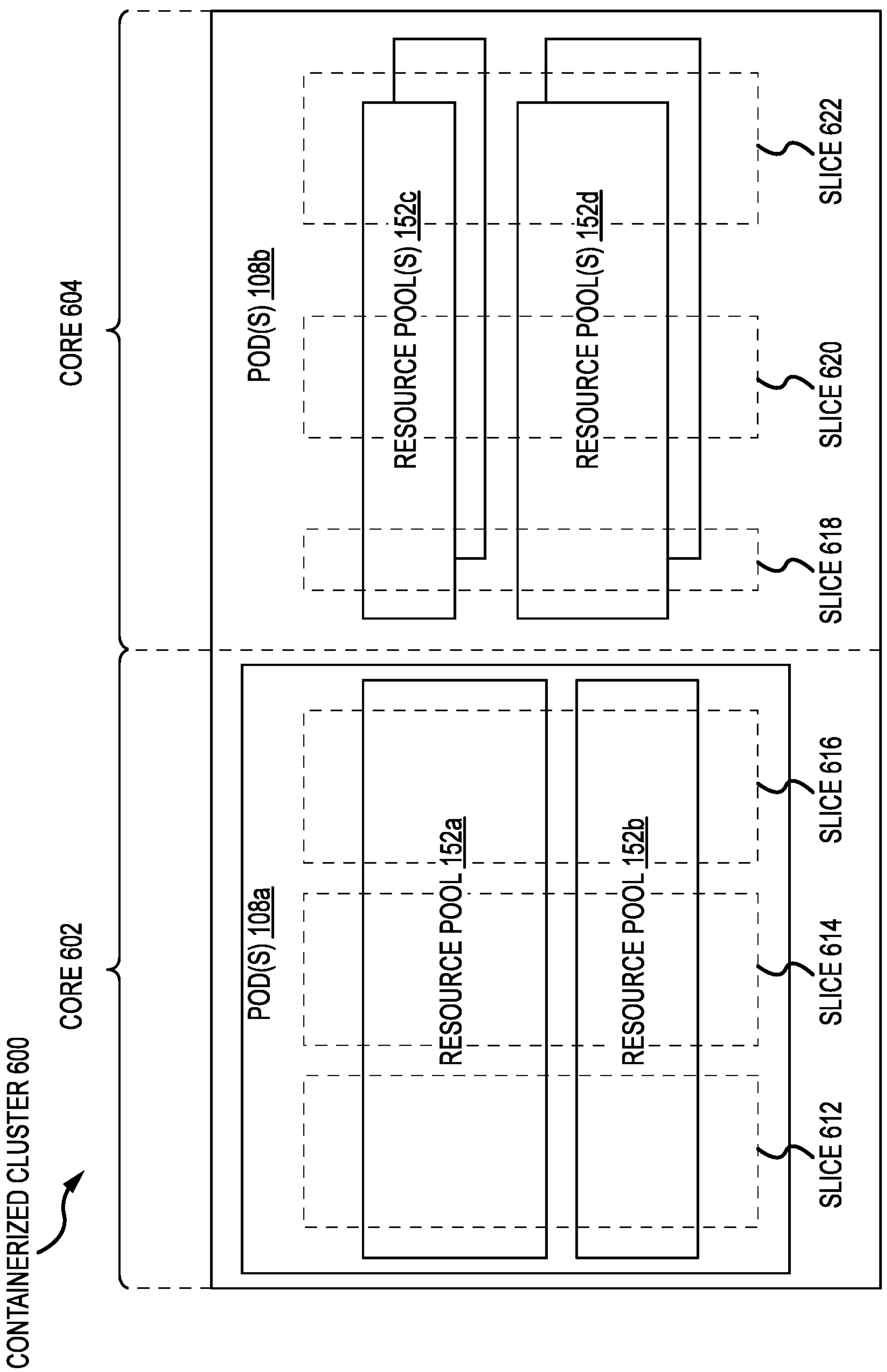
FIG. 6 illustrate an example of a containerized cluster implemented in the communication system of FIG. 1, in accordance with one or more embodiments.
Figure 7:
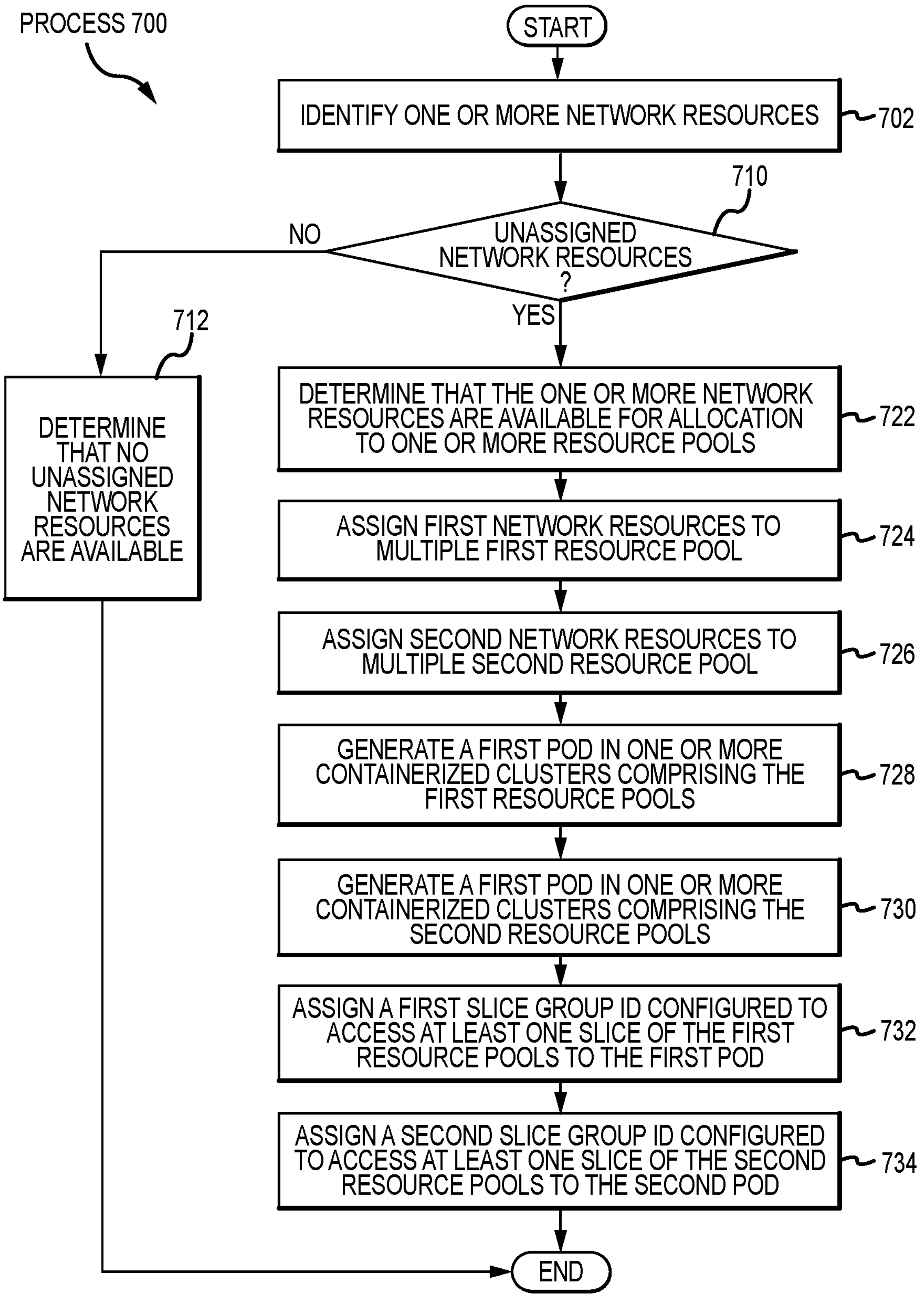
FIG. 7 illustrates an example flowchart of a method to dynamically assign network resources to slices in pods, in accordance with one or more embodiments.

In one or more embodiments, systems and methods described herein are configured to dynamically assign network resources in pods. In one or more embodiments, FIG. 1 illustrates a communication system 100 in which a server 102 generates one or more assignments 104 to access one or more services 106 in the communication system 100. FIGS. 2A and 2B illustrate a containerized cluster 200*a* and a containerized cluster 200*b*, respectively. The containerized cluster 200*a* and the containerized cluster 200*b* are implemented by the communication system 100 of FIG. 1. FIG. 3 illustrates a process 300 to dynamically generate assignments 104 to access the one or more services 106 as performed by the communication system 100 of FIG. 1. FIGS. 4A and 4B illustrate a containerized cluster 400*a* and a containerized cluster 400*b*, respectively. The containerized cluster 400*a* and the containerized cluster 400*b* are implemented by the communication system 100 of FIG. 1. FIG. 5 illustrates a process 500 to dynamically generate assignments 104 to access the one or more services 106 as performed by the communication system 100 of FIG. 1. FIG. 6 illustrates a containerized cluster 600 implemented by the communication system 100 of FIG. 1. FIG. 7 illustrates a process 700 to dynamically generate assignments 104 to access the one or more services 106 as performed by the communication system 100 of FIG. 1.

Herein, the multiple references to containerized clusters are non-limiting examples of containerized service clusters configured as container orchestration platforms for scheduling and automating deployment, management, and scaling of containerized services (e.g., applications).

Communication System Overview

FIG. 1 illustrates a diagram of a communication system 100 (e.g., a wireless communication system) comprises a server 102 configured to dynamically create one or more assignments 104 to access the one or more services 106, in accordance with one or more embodiments. The assignments 104 may be outputs configured to provide assignments of network resources 107 to one or more pods 108. The network resources 107 may be power resources, memory resources, and/or processing resources that are consumed in the communication system 100 to communicate in one or more data networks 110. In FIG. 1, the server 102 is communicatively coupled to multiple devices in the communication system 100. While FIG. 1 shows the server 102 connected directly to the one or more data networks 110, the server 102 may be located inside a core network 112 as part of one or more network components 114*a*-114*f* (collectively, network components 114) in the core network 112.

In one or more embodiments, the communication system 100 comprises the user equipment 116*a*-116*g* (collectively, user equipment 116), a radio access network (RAN) 118, the core network 112, the one or more data networks 110, and the server 102. In some embodiments, the communication system 100 may comprise a Fifth Generation (5G) mobile network or wireless communication system, utilizing high frequency bands (e.g., 24 Gigahertz (GHz), 39 GHz, and the like) or lower frequency bands such (e.g., frequency range FR1 Sub 6 GHz-less than 7.125 GHz). In this regard, the communication system 100 may comprise a large number of antennas. In some embodiments, the communication system may perform one or more communication operations associated with 5G New Radio (NR) protocols described in reference to the Third Generation Partnership Project (3GPP). As part of the 5G NR protocols, the communication system 100 may perform one or more millimeter (mm) wave technology operations to improve bandwidth or latency in wireless communications.

In some embodiments, the communication system 100 may be configured to partially or completely enable communications via one or more various radio access technologies (RATs), wireless communication technologies, or telecommunication standards, such as Global System for Mobiles (GSM) (e.g., Second Generation (2G) mobile networks), Universal Mobile Telecommunications System (UMTS) (e.g., Third Generation (3G) mobile networks), Long Term Evolution (LTE) of mobile networks, LTE-Advanced (LTE-A) mobile networks, 5G NR mobile networks, or Sixth Generation (6G) mobile networks.

Service-Based Architecture

The communication system 100 may comprise a service-based architecture (SBA). The SBA may be an organization scheme in the core network 112 that comprises authentication, security, session management, and aggregation of traffic from end devices (e.g., the user equipment 116). In the SBA, the core network 112 may be representative of the 5G Core network and comprises multiple network components 114. In the SBA, the network components 114 are hardware (e.g., electronic circuitry with communication ports, a processor, and a memory) configured to perform one or more specific network functions (NFs) 119. Herein, the network components 114*a*-114*f* may be configured to perform one or more NFs 119. The NFs 119 maybe referenced using an NF-associated name. For example, a network component 114*a* configured to perform a network repository function (NRF) 119*a* may be referred to as an NRF (or a NRF network component). In another example, one of the network components 119*a*-119*f* may comprise a version of the server 102 with a server processor 120 configured to perform one or more specific NFs 119.

In some embodiments, individual network components 114 provide services or resources to other network components 114 performing different NFs 119. In other embodiments, each NF is a service provider that allocates one or more resources in communications inside or outside the network components 114 to provide one or more services 106. The services may be specific for each of the network components 114 and their respective NFs 119 instead of each of the network components 114 providing and consuming processing resources and memory resources to perform multiple NFs 119 in the core network 112. In 5G NR mobile networks, the SBA is defined by 3GPP to comprise one or more network components 114 configured to perform specific NFs 119 to provide control plane operations and user plane operations. In the 5G NR, the control plane comprises any part of the communication system 100 that controls operations and routing associated with data packets and forwarding operations. Further, in the 5G NR, the user plane comprises any part of the communication system 100 that carries user traffic operations.

In one or more embodiments, the SBA may be configured to provide slices in accordance with specific application scenarios. A slice may be portions of a collection of NFs 119 that are combined into providing specific application resources. The application resources may be provided to one or more user equipment 116 simultaneously via web-based Application Programming Interfaces (APIs). The APIs may enable flexible and agile deployment of innovative services. An API may be a set of instructions that, when executed by a processor, perform modular or cloud-native functions and procedures allowing creation of applications (e.g., the services 106) that access features or data of an operating system, application, or other service in the communication system 100.

Communication System Components

Server

The server 102 is generally any apparatus or device that is configured to process data, communicate with the data networks 110, one or more network components 114 in the core network 112, the RAN 118, and the user equipment 116. The server 102 may be configured to monitor, track data, control routing of signal, and control operations of certain electronic components in the communication system 100, associated databases, associated systems, and the like, via one or more interfaces. The server 102 is generally configured to oversee operations of the server processing engine 122. The operations of the server processing engine 122 are described further below. In some embodiments, the server 102 comprises the server processor 120, one or more server Input (I)/Output (O) interfaces 124 configured to communicate one or more distributed unit (DU) assignments **126*a* and one or more radio unit (RU) assignments 126*b*, and a server memory 128 communicatively coupled to one another. The server 102 may be configured as shown, or in any other configuration. As described above, the server 102 may be located in one of the network components 114 located in the core network 112 and may be configured to perform one or more NFs 119 associated with communication operations of the core network 112**.

In one or more embodiments, the server processor 120, the server I/O interfaces 124, and the server memory 128 may be located at a same location or distributed over multiple remote locations separate from one another.

The server processor 120 may comprise one or more processors operably coupled to and in signal communication with the server I/O interfaces 124, and the server memory 128. The server processor 120 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The server processor 120 may be a programmable logic device, a microcontroller, a microprocessor, or any suitable combination of the preceding. The one or more processors in the server processor 120 are configured to process data and may be implemented in hardware or software executed by hardware. For example, the server processor 120 may be an 8-bit, a 16-bit, a 32-bit, a 64-bit, or any other suitable architecture. The server processor 120 may comprise an arithmetic logic unit (ALU) to perform arithmetic and logic operations, processor registers that supply operands to the ALU, and store the results of ALU operations, and a control unit that fetches software instructions such as server instructions 130 from the server memory 128 and executes the server instructions 130 by directing the coordinated operations of the ALU, registers and other components via the server processing engine 122. The server processor 120 may be configured to execute various instructions 130. For example, the server processor 120 may be configured to execute the server instructions 130 to perform functions or perform operations disclosed herein, such as some or all of those described with respect to FIGS. 1-7. In some embodiments, the functions described herein are implemented using logic units, FPGAs, ASICs, DSPs, or any other suitable hardware or electronic circuitry.

In the example of FIG. 1, the server I/O interfaces 124 may comprise one or more displays configured to display a two-dimensional (2D) or three-dimensional (3D) representation of a service. Examples of the representations may comprise, but are not limited to, a graphical or simulated representation of an application, diagram, tables, or any other suitable type of data information or representation. In some embodiments, the one or more displays may be configured to present visual information to one or more users 129. The one or more displays may be configured to present visual information to the one or more users 129 updated in real-time. The one or more displays may be a wearable optical display (e.g., glasses or a head-mounted display (HMD)) configured to reflect projected images and enable user to see through the one or more displays. For example, the one or more displays may comprise display units, one or more lenses, one or more semi-transparent mirrors embedded in an eye glass structure, a visor structure, or a helmet structure. Examples of display units comprise, but are not limited to, a cathode ray tube (CRT) display, a liquid crystal display (LCD), a liquid crystal on silicon (LCOS) display, a light emitting diode (LED) display, an organic LED (OLED) display, an active-matrix OLED (AMOLED) display, a projector display, or any other suitable type of display. In another embodiment, the one or more displays are a graphical display on the server 102. For example, the graphical display may be a tablet display or a smartphone display configured to display the data representations.

In one or more embodiments, the server I/O interfaces 124 may be hardware configured to perform one or more communication operations. The server I/O interfaces 124 may comprise one or more antennas as part of a transceiver, a receiver, or a transmitter for communicating using one or more wireless communication protocols or technologies. In some embodiments, the server I/O interfaces 124 may be configured to communicate using, for example, NR or LTE using at least some shared radio components. In other embodiments, the server I/O interfaces 124 may be configured to communicate using single or shared radio frequency (RF) bands. The RF bands may be coupled to a single antenna, or may be coupled to multiple antennas (e.g., for a multiple-input multiple output (MIMO) configuration) to perform wireless communications.

The server I/O interfaces 124 may comprise one or more server network interfaces that may be any suitable hardware or software (e.g., executed by hardware) to facilitate any suitable type of communication in wireless or wired connections. These connections may comprise, but not be limited to, all or a portion of network connections coupled to additional network components 114 in the core network 112, the RAN 118, the user equipment 116, the Internet, an Intranet, a private network, a public network, a peer-to-peer network, the public switched telephone network, a cellular network, a local area network (LAN), a metropolitan area network (MAN), a wide area network (WAN), and a satellite network. The server network interface 124 may be configured to support any suitable type of communication protocol.

The server I/O interfaces 124 may comprise one or more administrator interfaces that may be user interfaces configured to provide access and control to of the server 102 to one or more users 129 via the user equipment 116 or electronic devices. The one or more users 129 may access the server memory 128 upon confirming one or more access credentials to demonstrate that access or control to the server 102 may be modified. In some embodiments, the one or more administrator interfaces may be configured to provide hardware and software resources to the one or more users 129. Examples of user devices comprise, but are not limited to, a laptop, a computer, a smartphone, a tablet, a smart device, an Internet-of-Things (IoT) device, a simulated reality device, an augmented reality device, or any other suitable type of device. The administrator interfaces may enable access to one or more graphical user interfaces (GUIs) via an image generator display (e.g., the one or more displays), a touchscreen, a touchpad, multiple keys, multiple buttons, a mouse, or any other suitable type of hardware that allow users 129 to view data or to provide inputs into the server 102. The server 102 may be configured to allow users 129 to send requests to one or more network components 114 or network.

In some embodiments, the server I/O interfaces 124 may be configured to provide the one or more DU assignments **126*a* and the one or more RU assignments 126*b* to one or more electronic components in the communication system 100. The DU assignments 126*a* may be one or more assignments 104 of one or more network resources 107 generated for one or more DUs in the communication system 100. The DUs may be hardware and software executed by hardware that is deployed on a cell site in communication with the server 102. The DUs may be deployed close to the RUs on the cell site and provides support for lower layers of a protocol stack such as the radio link control (RLC), medium access control (MAC), and parts of the physical (PHY) layer. The RU assignments 126*b* may be one or more assignments 104 of one or more network resources 107 generated for one or more RUs in the communication system 100**. The RUs are radio hardware entities that convert radio signals sent to and from antennas into digital signals for transmission over a packet network. The RUs handle a digital front end (DFE) and a lower PHY layer.

The server memory 128 may be volatile or non-volatile and may comprise a read-only memory (ROM), random-access memory (RAM), ternary content-addressable memory (TCAM), dynamic random-access memory (DRAM), and static random-access memory (SRAM). The server memory 128 may be implemented using one or more disks, tape drives, solid-state drives, and/or the like. The server memory 128 is operable to store the server instructions 130, one or more layer operations 132, one or more directories 134 comprising access to tenant profiles 136 associated with the one or more services 106 and the one or more of the NFs 119, an access control list 138, one or more rules and policies 140, one or more access commands 142, the one or more assignments 104 comprising the one or more network resources 107 assigned to the one or more pods 108, one or more system level agreements (SLAs) 144, one or more cell identifiers (IDs) 146, one or more slice group IDs 148, one or more machine learning (ML) models 150, one or more resource pools **152*a* and 152*b* (collectively, resource pools 152), one or more tier lists 154 comprising one or more tiers 156*a*-156*c* (collectively, tiers 156), an ML algorithm 158, and one or more artificial intelligence (AI) commands 160. The cell IDs 146 may be an ID indicating at least one cell that is configured to be associated with at least one pod 108 in one or more container clusters 162*a* and 162*b* (collectively, container clusters 162) associated with the core network 112. In the server memory 128, the server instructions 130 may comprise commands and controls for operating one or more specific NFs 119 in the core network 112 when executed by the server processing engine 122 of the server processor 120**.

Herein, the multiple references to container clusters 162 are non-limiting examples of containerized service clusters configured as container orchestration platforms for scheduling and automating deployment, management, and scaling of containerized services (e.g., applications).

In one or more embodiments, the access commands 142 are configured to establish one or more communication sessions between two or more network components 114 in the core network 112. The access commands 142 may be configured to establish one or more communication sessions between one or more network components 114 in the core network 112 and one of the user equipment 116. Each configuration command of the access commands 142 may establish a communication session between a first network component of the network components 114 comprising the server 102 and a second network component of the network components 114 based at least in part upon a first configuration command of the access commands 142. The access commands 142 may be routing and configuration information for reinstating or reestablishing communication sessions when a change is detected in the operations of the core network 112. For example, in response to losing a specific communication session established with the first access command, the server 102 may attempt to reinstate the specific communication session based at least in part upon a second access command. The access commands 142 may be dynamically or periodically updated from another of the network components 114 in the core network 112. Herein, communication sessions refer to communication signals exchanged between the server 102 and additional network components 114 in the core network 112. In some embodiments, the access commands 142 are provided to the server 102 from another of the network components 114 performing a specific NF. The access commands 142 may be configured to enable access of the one or more services 106. The access commands 142 may be configured to enable access of one or more cell IDs 146 (referenced in FIGS. 2A-3), the one or more resource pools 152 (referenced in FIGS. 4A-5), and/or one or more slice group IDs 148 (referenced ion FIGS. 6 and 7) in one or more container clusters 162.

The directories 134 may be configured to store service-specific information, tenant-specific information, and/or user-specific information. The directories 134 may enable the server 102 to confirm tenant credentials to access one or more network components (e.g., one of the network components 114 configured to perform the NRF 119*a*, an authentication server function (AUSF) 119*b*, an access and management function (AMF) 119*c*, one or more cloud network functions (CNFs) 119*d*, a policy control function (PCF) 119*e*, a unified data repository (UDR) 119*f*, a session management function (SMF) 119*g*, one or more Service Communication Proxys (SCPs) 119*h*, or the like) in the core network 112. The directories 134 may be configured to store the tenant profiles 136 and a reference to the one or more services 106. The directories 134 may be configured to store provider-specific information and service-specific information. The provider-specific information may enable the server 102 to validate credentials associated with a specific provider (e.g., one of the NFs 119) against corresponding user-specific information and service-specific information. In some embodiments, the tenant profiles 136 may comprise lists of electronic devices (e.g., the user equipment 116) that are configured to receive resources allocated from the server 102.

In one or more embodiments, the access commands 142 may be a communication or a message configured to indicate a request for access of an application (via an API) or a service 106. In some embodiments, the access commands 142 may be a communication or a message configured to enable access to one or more entitlements in an application (via an API) or a service 106. The entitlements may be configured to provide one or more connectivity allowances (e.g., access) between the server 102, the user equipment 116, the one or more base stations 168, and the one or more of the network components 114. The entitlements may be assigned to specific departments or tenants. The entitlements may be predefined or dynamically defined in accordance with the rules and policies 140. The assignments 104 comprises allocation information and/or commands to modify usage of the network resources 107. The assignments 104 may distribute or redistribute the network resources 107 to modify operations at a base station (e.g., a cell site) in the RAN 118. The assignments 104 may comprise modifications (e.g., increase, reduction, and/or replacement) of the network resources 107 distributed to one or more of the pods 108. The network resources 107 may comprise power resources associated with a power supply, processing resources associated with a processor, and/or memory resources associated with a memory. In one or more embodiments, the network resources 107 may be dynamically enabled at any given base station 168 to modify routing operations of communication sessions. The network resources 107 may be modified at the given base station 168 and/or user equipment 116 to prioritize assigning resources to maintain certain communication sessions. For example, the processing resources may be reassigned at a base station 168 from one communication session to another communication session. In some embodiments, the assignments 104 may be modified in response to detecting a change or modification caused for a specific type of resource. For example, the network resources 107 may be reassigned to prioritize communication sessions between emergency organizations in a predefined area. In this example, a first number of the network resources 107 assigned to a first communication session may be dynamically reduced by an amount while a second number of the network resources 107 may be dynamically increased by the same amount. The assignments 104 may be generated dynamically (e.g., on demand) or periodically.

In one or more embodiments, the pods 108 are deployable units of computing that are created and managed in the containerized environment. The pods 108 may be configured as redundancies of one another or as standalone portions of a wireless communication network. The pods 108 may comprise one or more containers (e.g., the container clusters 162) with shared storage and network resources. The shared storage and network resources may be co-located and co-scheduled. The network resources 107 may be power resources, memory resources, and processing resources that are consumed in attempts to access the services 106 in a given communication system 100.

In one or more embodiments, the cell IDs 146 may be configured to reference one or more specific cells associated with any given service 106 for one or more given tenants. The slice group IDs 148 may be configured to reference one or more specific slice groups associated with any given service 106 for one or more given tenants. The resource pools 152 may be configured to provide the ability to define a level (e.g., amount) of service capacity that is available for these services 106 by geographical area and time slots. The resource pools 152 may be an aggregate collection of resources needed to perform a delivery service or provided service 106. In some embodiments, the resource pools 152 may be predefined or dynamically defined by an organization providing access to the network resources 107.

In one or more embodiments, the access control list 138 (also referred to as ACL) may comprise rules that may allow or deny access to one or more of the entitlements that allow user equipment 116 to access the services 106. The rules and policies 140 may be security configuration commands or regulatory operations predefined by an organization or one or more users 129. The rules and policies 140 may be dynamically defined by the one or more users 129. The one or more rules and policies 140 may be one or more a policy as defined in the 3GPP standards. The SLAs 144 may be configured to define one or more levels of service 106 expected by a tenant, laying out the metrics by which a given service 106 is measured.

In one or more embodiments, the pods 108 may be created and/or resized to enable the layer operations 132. The layer operations 132 may be configured to perform Layer 1 (L1) operations and/or Layer 2 (L2) operations. In some embodiments, the server 102 may be configured to maintain a pool of floating resources for each layer. In this regard, the server 102 may be configured to create and maintain an L1 resource pool 152, an L2 resource pool 152, and/or a floating resource pool 152 to enable L1 operations and L2 operations. In some embodiments, the server 102 may be configured to monitor utilization of the L1 resource pool 152, the L2 resource pool 152, and/or the floating resource pool 152 and determining whether to resize the resource pools 152 to optimize usage of the network resources 107.

The tier lists 154 comprise one or more priority levels for one or more communication sessions established in the communication system 100. In one or more embodiments, the server 102 may be configured to control, monitor, and regulate the communication sessions in accordance with one or more of the tier lists 154. The tier lists 154 may be modified over time such that new tier lists 154 may be added or removed, as-needed dynamically or periodically. The tier lists 154 may be modified immediately upon a triggering event caused by an admin console access. The tier lists 154 may be modified periodically upon entering a triggering event during a maintenance window. In some embodiments, the server 102 may dynamically manage spectra for all three tiers 156 with first priority for user equipment 116 in a first tier 156A, second priority for user equipment 116 in a second tier 156B, and third for user equipment 116 in a third tier 156C. In some embodiments, to use the spectrum, the server 102 may use the tenant profiles 136 to assign one or more resources (e.g., network resources 107) and deploy corresponding access points. For example, one of the user equipment 116 may request use of spectrum channels via a connection request. In turn, the server 102 (e.g., acting as at least a part of an administrator) may receive connectivity data in the request indicating latitude, longitude, and height into a database (e.g., the server memory 128). In some embodiments, the server 102 may determine whether the requested spectrum is available. The server 102 may then assign spectrum channels and grant authority to operate in the channels in accordance with a priority level (e.g., depending on the tiers 156). In this regard, the server 102 may authorize allocation of appropriate transmission power levels and allocation of channel resources.

In one or more embodiments, the ML algorithm 158 may be executed by the server processor 120 to evaluate the usage in the network resources 107 in the pods 108. Further, the ML algorithm 158 may be configured to interpret and transform information associated with the network resources 107 into structured data sets and subsequently stored as files or tables. The ML algorithm 158 may cleanse, normalize raw data, and derive intermediate data to generate uniform data in terms of encoding, format, and data types. The ML algorithm 158 may be executed to run user queries and advanced analytical tools on the structured data. The ML algorithm 158 may be configured to generate the one or more AI commands 160 based on current usage of the resources 107 in the pods 108, the resource pools 152, and/or existing instructions 130. In turn, the server processor 120 may be configured to generate the assignments 104 dynamically based on the outputs of the ML algorithm 158. The AI commands 160 may be parameters that modify the allocation and/or assignment of the resources 107 in the assignments 104. The AI commands 160 may be combined with the existing instructions 130 to create the dynamic instructions and/or configuration commands. In one or more embodiments, the dynamic instructions and/or configuration commands may be dynamically-generated updates for the existing instructions 130.

In one or more embodiments, the ML algorithm 158 may be configured to generate one or more ML models 150 that preemptively modify the assignments 104 based at least in part upon the usage of the network resources 107 in the pods 108. In some embodiments, the server 102 may be configured to generate a library of ML models 150 categorized in accordance with one or more categories and/or characteristics. The one or more categories and/or characteristics may comprise morphology, spectrum deployed, traffic utilization, services offered, broadband, voice, mission critical, strict SLAs, and the like. One or more of the ML models 150 may be configured with attributes that are priority for each of the services 106, air interface capacity per cell, and/or numbers of network resources 107 associated with a specific Quality of Service (QoS).

In one or more embodiments, the ML models 150 may be created and maintained based at least in part upon one or more different characteristics. For example, a nominal mapping of an assignment 104 of multiple network resources 107 for a couple of cell IDs 146 in a single pod 108 may be implemented in the communication system 100. After a period of time, the ML algorithm 158 following an existing ML model 150 may be configured to generate one or more AI commands 160 that trigger changes in the allocation of the network resources 107. The ML model 150 may be configured to account for urban morphology, urban density, rural morphology, rural density, and similar conditions. In this regard, the trigger may cause a new assignment 104 to be generated in which the network resources 107 are reallocated to better enable communication sessions and operations in the communication system 100. The changes may comprise changes in spectrum availability, power consumption, and the like to optimize QoS while optimizing overall traffic conditions in the communication sessions.

In one or more embodiments, the assignments 104 cause additional pods 108 to be generated and/or previous pods 108 to be discarded and/or deactivated. The assignments 104 may cause different resource pools 152 to be modified. For example, the network resources 107 assigned for a college campus may be dynamically modified based on student attendance, campus events, weather changes, and the like. Further, the network resources 107 may be dynamically assigned, redistributed, and/or modified for different slices overlapping the resource pools 152. In some embodiments, the network resources 107 may be dynamically assigned, redistributed, and/or modified for different slice groups comprising one or more individual slices overlapping the resource pools 152. The network resources 107 may be dynamically assigned, redistributed, and/or modified to increase, reduce, and/or maintain uplink (UL) operations. For example, some of the pods 108 may be dynamically assigned network resources 107 configured to mostly implement UL operations. The network resources 107 may be dynamically assigned, redistributed, and/or modified to increase, reduce, and/or maintain downlink (DL) operations. For example, some of the pods 108 may be dynamically assigned network resources 107 configured to mostly implement DL operations.

Herein, the network resources 107 may be dynamically allocated to the pods 108 to include one or more of the aforementioned characteristics. For example, a given pod 108 may be generated to include certain number of network resources 107 for slices configured in resource pools 152 to perform L1 operations and DL operations. In the containerized environment, the pods 108 may be assigned to specific cores and/or specific containerized clusters.

User Equipment

In one or more embodiments, each of the user equipment 116 may be any computing device configured to communicate with other devices, such as the server 102, other network components 114 in the core network 112, databases, and the like in the communication system 100. Each of the user equipment 116 may be configured to perform specific functions described herein and interact with one or more network components 114 in the core network 112 via one or more base stations 168*a*-168*g* (collectively, base stations 168). Examples of user equipment 116 comprise, but are not limited to, a laptop, a computer, a smartphone, a tablet, a smart device, an IoT device, a simulated reality device, an augmented reality device, or any other suitable type of device.

In one or more embodiments, referring to the user equipment 116*a* as a non-limiting example of the user equipment 116, the user equipment 116*a* may comprise a user equipment (UE) network interface 170, a UE I/O interface 172, a UE processor 174 executing operations via a UE processing engine 176, and a UE memory 178 comprising one or more instructions 180 configured to be executed by the UE processor 174. The UE network interface 170 may be any suitable hardware or software (e.g., executed by hardware) to facilitate any suitable type of communication in wireless or wired connections. These connections may comprise, but not be limited to, all or a portion of network connections coupled to additional network components 114 in the core network 112, the RAN 118, the Internet, an Intranet, a private network, a public network, a peer-to-peer network, the public switched telephone network, a cellular network, a local area network (LAN), a metropolitan area network (MAN), a wide area network (WAN), and a satellite network. The UE network interface 170 may be configured to support any suitable type of communication protocol.

The UE I/O interface 172 may be hardware configured to perform one or more communication operations. The UE I/O interface 172 may comprise one or more antennas as part of a transceiver, a receiver, or a transmitter for communicating using one or more wireless communication protocols or technologies. In some embodiments, the UE I/O interface 172 may be configured to communicate using, for example, 5G NR or LTE using at least some shared radio components. In other embodiments, the UE I/O interface 172 may be configured to communicate using single or shared RF bands. The RF bands may be coupled to a single antenna, or may be coupled to multiple antennas (e.g., for a MIMO configuration) to perform wireless communications. In some embodiments, the user equipment 116*a* may comprise capabilities for voice communication, mobile broadband services (e.g., video streaming, navigation, and the like), or other types of applications. In this regard, the UE I/O interface 172 of the user equipment 116*a* may communicate using machine-to-machine (M2M) communication, such as machine-type communication (MTC), or another type of M2M communication.

In some embodiments, the user equipment 116*a* is communicatively coupled to one or more of the base stations 168 via one or more communication links 190*a*-190*g* (e.g., collectively, communication links 190). The user equipment 116*a* may be a device with cellular communication capability such as a mobile phone, a hand-held device, a computer, a laptop, a tablet, a smart watch or other wearable device, or virtually any type of wireless device. In some applications, the user equipment 116 may be referred to as a UE, UE device, or terminal.

The UE processor 174 may comprise one or more processors operably coupled to and in signal communication with the UE network interface 170, the UE I/O interface 172, and the UE memory 178. The UE processor 174 is any electronic circuitry, including, but not limited to, state machines, one or more CPU chips, logic units, cores (e.g., a multi-core processor), FPGAs, ASICs, or DSPs. The UE processor 174 may be a programmable logic device, a microcontroller, a microprocessor, or any suitable combination of the preceding. The one or more processors in the UE processor 174 are configured to process data and may be implemented in hardware or software executed by hardware. For example, the UE processor 174 may be an 8-bit, a 16-bit, a 32-bit, a 64-bit, or any other suitable architecture. The UE processor 174 comprises an ALU to perform arithmetic and logic operations, processor registers that supply operands to the ALU, and store the results of ALU operations, and a control unit that fetches software instructions such as UE instructions 180 from the UE memory 178 and executes the UE instructions 180 by directing the coordinated operations of the ALU, registers, and other components via a UE processing engine 176. The UE processor 174 may be configured to execute various instructions. For example, the UE processor 174 may be configured to execute the UE instructions 180 to implement functions or perform operations disclosed herein, such as some or all of those described with respect to FIGS. 1-7. In some embodiments, the functions described herein are implemented using logic units, FPGAs, ASICs, DSPs, or any other suitable hardware or electronic circuitry.

Radio Access Network

In one or more embodiments, the RAN 118 enables the user equipment 116 to access one or more services in the core network 112. The one or more services may be a mobile telephone service, a Short Message Service (SMS) message service, a Multimedia Message Service (MMS) message service, an Internet access, cloud computing, or other types of data services. The RAN 118 may comprise the base stations 168 in signal communication with the user equipment 116 via the one or more communication links 190. Each of the base stations 168 may service the user equipment 116*a*-116*g*. In some embodiments, while multiple base stations 168 are shown connected to multiple user equipment 116 via the communication links 190, one or more additional base stations 168 may be connected to one or more additional user equipment 116 via one or more additional communication links 190. For example, the base stations 168*a*-168*g* may exchange connectivity signals with the user equipment 116*a* via the communication link 190*a*. In another example, the base station 168*g* may exchange connectivity signals with the user equipment 116*g* via the communication link 190*g*. In yet another example, the base stations 168 may service some user equipment 116 located within a geographic area serviced by one of the base In one or more embodiments, referring to the base station 168*a* as a non-limiting example of the base station 168, the base station 168*a* may comprise a base station (BS) network interface 182, a BS I/O interface 184, a BS processor 186, and a BS memory 188. The BS network interface 182 may be any suitable hardware or software (e.g., executed by hardware) to facilitate any suitable type of communication in wireless or wired connections between the core network 112 and the user equipment 116. These connections may comprise, but not be limited to, all or a portion of network connections coupled to additional network components 114 in the core network 112, other base stations 168, the user equipment 116, the Internet, an Intranet, a private network, a public network, a peer-to-peer network, the public switched telephone network, a cellular network, a LAN, a MAN, a WAN, and a satellite network. The BS network interface 182 may be configured to support any suitable type of communication protocol.

The BS I/O interface 184 may be hardware configured to perform one or more communication operations. The BS I/O interface 184 may comprise one or more antennas as part of a transceiver, a receiver, or a transmitter for communicating using one or more wireless communication protocols or technologies. In some embodiments, the BS I/O interface 184 may be configured to communicate using, for example, 5G NR or LTE using at least some shared radio components. In other embodiments, the BS I/O interface 184 may be configured to communicate using single or shared RF bands. The RF bands may be coupled to a single antenna, or may be coupled to multiple antennas (e.g., for a MIMO configuration) to perform wireless communications. In some embodiments, the base station 168*a* may allocate resources in accordance with one or more routing and configuration operations obtained from the core network 112. In some embodiments, resources may be allocated to enable capabilities in the user equipment 116 for voice communication, mobile broadband services (e.g., video streaming, navigation, and the like), or other types of applications.

In some embodiments, the base station 168*a* is communicatively coupled to one or more of the user equipment 116 via the one or more communication links 190. In some applications, the base stations 168 may be referred to as a BS, evolved Node B (eNodeB or eNB), a next generation Node B, gNodeB, gNB, or terminal.

The BS processor 186 may comprise one or more processors operably coupled to and in signal communication with the BS network interface 182, the BS I/O interface 184, and the BS memory 188. The BS processor 186 is any electronic circuitry, including, but not limited to, state machines, one or more CPU chips, logic units, cores (e.g., a multi-core processor), FPGAs, ASICs, or DSPs. The BS processor 186 may be a programmable logic device, a microcontroller, a microprocessor, or any suitable combination of the preceding. The one or more processors in the BS processor 186 are configured to process data and may be implemented in hardware or software executed by hardware. For example, the BS processor 186 may be an 8-bit, a 16-bit, a 32-bit, a 64-bit, or any other suitable architecture. The BS processor 186 comprises an ALU to perform arithmetic and logic operations, processor registers that supply operands to the ALU, and store the results of ALU operations, and a control unit that fetches software instructions (not shown) from the BS memory 188 and executes the software instructions by directing the coordinated operations of the ALU, registers, and other components via a processing engine (not shown) in the BS processor 186. The BS processor 186 may be configured to execute various instructions. For example, the BS processor 186 may be configured to execute the software instructions to implement functions or perform operations disclosed herein, such as some or all of those described with respect to FIGS. 1-7. In some embodiments, the functions described herein are implemented using logic units, FPGAs, ASICs, DSPs, or any other suitable hardware or electronic circuitry.

Core Network

The core network 112 may be a network configured to manage communication sessions for the user equipment 116. In one or more embodiments, the core network 112 may establish connections between user equipment 116 and a particular data network 110 in accordance with one or more communication protocols. The core network 112 may be a multi-core network 112 configured to comprise multiple cores. In this regard, the multi-core network may comprise multiple NFs 119 in each core. In the example of FIG. 1, the core network 112 comprises the network component 114*a* configured to perform the NRF 119*a*, the network component 114*b* configured to perform the AUSF 119*b*, the network component 114*c* configured to perform the AMF 119*c*, the network component 114*d* configured to perform the CNFs 119*d*, the network component 114*e* configured to perform the PCF 119*e* and the UDR 119*f*, and the network component 114*f* configured to perform the SMF 119*g* and the SCPs 119*h*. Herein, as a non-limiting example, while the NRF 119*a* is associated with the network component 114*a*, the core network 112 may comprise multiple network component 114 performing the NRF 119*a*. For example, a Unified Data Management (UDM) may be part of a core.

In some embodiments, the NRF 119*a* may comprise a service registration procedure that accesses the one or more databases to store or retrieve routing and configuration information associated with one or more network components 114 in the core network 112. The NRF 119*a* may access the database to discover services offered by other networks or other network components 114 with service discovery procedures and service authorization procedures. The NRF 119*a* may maintain a list of available NFs operations available in the core network 112 and any network components 114 associated with performing a given NF 119. The NRF 119*a* may also performs registration and discovery of service such that different NFs 119 may find each other via APIs. As an example, when the SMF 119*g* is registered to the NRF 119*a*, the SMF 119*g* is discoverable by the AMF 119*c* when the user equipment 116 attempts to access a given service type via the SMF 119*g*. In other embodiments, the NFs 119 may be connected via a communication bus to all other additional network elements in the core network 112. In the SBA, the NRF 119*a* may enable access between the user equipment 116 and the services offered via the NFs 119.

In one or more embodiments, the network components 114*d* performing the one or more CNFs 119*d* may be configured to operate multiple services associated with one or more services 106, while dynamically directing network traffic within the core network 112. In some embodiments, the network component 114*f* performing the SMF 119*g* may be configured to manage one or more communication sessions established between network components 114 of the core network 112, allocate and manage resource allocation routing for the user equipment 116, user plane selection, QoS and configuration enforcements for the control plane, service registration, discovery, establishment, and the like. In other embodiments, the network component 114*c* performing the AMF 119*c* may be configured to manage mobility, registration, connections, and overall access for the other network components 114 in the core network 112. The AMF 119*c* may act as an entry point for connections between the user equipment 116 and a given service. In yet other embodiments, the network component 114*f* performing the one or more SCPs 119*h* may be configured to provide a point of entry for a cluster of NFs 119 in the core network 112 to the user equipment 116 once the user equipment 116 are discovered by the NRF 119*a*. This allows the SCPs 119*h* to be delegated discovery points in the core network 112. The network component 114*b* performing the AUSF 119*b* may be configured to share performing of some of the aforementioned operations with a Unified Data Management (UDM) (not shown). In this regard, the AUSF 119*b* may be configured to perform authentication processes while the UDM manages user data for any other processes in the core network 112. In other embodiments, the UDM may receive requests for subscriber data from the SMF 119*g*, the AMF 119*c*, and the AUSF 119*b* before providing any services 106. The AUSF 119*b* may be implemented in one of the network components 114 configured to enable the AMF 119*c* to authenticate the user equipment 116. The network component 114*e* performing the PCF 119*e* may be configured to provide a policy control framework in which the rules and policies 140 are implemented in accordance with one or more application guidelines. In some embodiments, the PCF 119*e* may apply policy decisions to services provided, accessing subscription information, and the like to control behavior associated with the core network 112. The network component 114*f* performing the UDR 119*f* configured to operate as a centralized data repository for subscription data, subscriber policy data, session information, context information, and application states. In some embodiments, the UDR 119*f* may be configured to provide API integrations with other NFs 119 to retrieve subscriber subscription and policy data. The UDR 119*f* may notify other NFs 119 of changes in subscriber data, supports real-time or batch (e.g., bulk) data access provisioning and subscriber data provisioning, and manages service parameters and application data for advanced applications.

In some embodiments, the core network 112 enables the user equipment 116 to communicate with the server 102, or another type of device, located in a particular data network 110 or in signal communication with a particular data network 110. The core network 112 may implement a communication method that does not require the establishment of a specific communication protocol connection between the user equipment 116 and one or more of the data networks 110. The core network 112 may include one or more types of network devices (not shown), which may perform different NFs 119.

In some embodiments, the core network 112 may include a 5G NR or an LTE access network (e.g., an evolved packet core (EPC) network) among others. In this regards, the core network 112 may comprise one or more logical networks implemented via wireless connections or wired connections. Each logical network may comprise an end-to-end virtual network with dedicated power, storage, or computation resources. Each logical network may be configured to perform a specific application comprising individual policies, rules, or priorities. Further, each logical network may be associated with a particular QoS class, type of service, or particular user associated with one or more of the user equipment 116. For example, a logical network may be a Mobile Private Network (MPN) configured for a particular organization. In this example, when the user equipment **116*a* is configured and activated by a wireless network associated with the RAN 118, the user equipment 116*a* may be configured to connect to one or more particular network slices (i.e., logical networks) in the core network 112. Any logical networks or slices that may be configured for the user equipment 116*a* may be configured using one of the network components 114 of FIG. 1 performing a Network Slice Selection Function (NSSF) that may store a subscription profile associated with the user equipment 116*a*, in a network component operating as a Unified Data Management (UDM). Further, when the user equipment 116*a* may request a connection to a particular logical network or slice, the user equipment 116*a* may send a request to the network component performing the AMF 119*c*. The AMF 119*c* may provide a list of allowed logical networks or slices to the user equipment 116*a*. The user equipment 116*a*** may then request a Packet Data Unit (PDU) connection with one or more of the provided logical networks or slices.

Data Networks

In the example system 100 of FIG. 1, the data networks 110 may facilitate communication within the communication system 100. This disclosure contemplates that the data networks 110 may be any suitable network operable to facilitate communication between the server 102, the core network 112, the RAN 118, and the user equipment 116. The data networks 110 may include any interconnecting system capable of transmitting audio, video, signals, data, messages, or any combination of the preceding. The data networks 110 may include all or a portion of a LAN, a WAN, an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, and the like), a Long Term Evolution (LTE) network, a Universal Mobile Telecommunications System (UMTS) network, a peer-to-peer (P2P) network, a Bluetooth network, a Near Field Communication network, a Zigbee network, or any other suitable network, operable to facilitate communication between the components of the communication system 100. In other embodiments, the communication system 100 may not have all of these components or may comprise other elements instead of, or in addition to, those above.

Dynamic Assignment of Cells to Pods

FIGS. 2A and 2B illustrate examples of container clusters 162 in accordance with one or more embodiments. In the example of FIG. 2A, a containerized cluster **200*a* is shown comprising a core 202 and a core 204 in a containerized environment. In the example of FIG. 2B, a containerized cluster 200*b* is shown comprising a core 206 and a core 208 in a containerized environment. Each of the cores 202-208 comprises at least one pod 108 and at least one cell associated with a cell ID 146. As described above, the cell ID 146 references the network resources 107 assigned to at least one cell for a given pod 108. The pods 108 are examples of possible pods 108 comprising resources assigned during a maintenance window or outside a maintenance window. In this regard, FIG. 2A shows pods 108 of equal sizes 214-216 while FIG. 2B shows pods of different sizes 262-266**.

In one or more embodiments, the pods **108*a*-108*f* are allocated in different order and/or different cores than those shown in FIGS. 2A and 2B. In one or more embodiments, the containerized cluster 200*a* and the containerized cluster 200*b* comprise dynamically assigned cell IDs 146*a*-146*x* in the pods 108*a*-108*f*. In particular, the containerized cluster 200*a* and the containerized cluster 200*b* may comprise cells that are dynamically redistributed and/or reassigned to the pods 108*a*-108*f*. The server 102 may be configured to distribute, redistribute, assign, and/or reassign the network resources 107 corresponding to multiple cells into the multiple pods 108*a*-108*f*. In some embodiments, the server 102 may be configured to analyze the network resources 107 available for different cells associated with the communication system 100 and assign these network resources 107 to individual pods 108 of equal or different size. The pods 108 may be configured to be deployed in a containerized environment (e.g., Kubernetes environment). The pods 108 may comprise network resources 107 that are co-located and co-scheduled. The pods may be configured as redundancies of one another or as standalone portions of the communication network. Herein, the server 102 may be configured to dynamically assign the network resources 107 during maintenance windows. Further, the server 102 may be configured to dynamically assign the network resources 107** outside of maintenance windows.

In FIG. 2A, as a non-limiting representative example, the core 202 in the containerized cluster **200*a* comprises a pod 108*a* and a pod 108*b*. The pod 108*a* in the core 202 comprises a size 212 and cell IDs 146*a*-146*d*. The pod 108*b* in the core 202 comprises a size 214 and cell IDs 146*e*-146*h*. The pod 108*c* in the core 204 comprises a size 216 and cell IDs 146*l*-146*l*. The sizes 216-216 are shown to be equal to one another. In this regard, each of the pods 108*a*-108*c* comprise a same number of network resources 107. In the example of FIG. 2A, the server 102 may be configured to assign network resources 107 corresponding to cells in the pods 108*a*-108*c*. In this regard, the server 102 is configured to assign the cells in accordance with the corresponding cell IDs 146*a*-146*l*. The cell IDs 146*a*-146*l* are representative of one or more cells. Herein, a number of the cell IDs 146*a*-146*l* indicate a number of resources assigned to a specific pod 108. The pod 108*a* is assigned the cell ID 146*a*, the cell ID 146*b*, the cell ID 146*c*, and the cell ID 146*d*. The pod 108*b* is assigned the cell ID 146*e*, the cell ID 146*f*, the cell ID 146***g*, and the cell ID 146*h*. The pod 108*c* is assigned the cell ID 146*i*, the cell ID 146*j*, the cell ID 146*k*, and the cell ID 146*l*.

In FIG. 2B, as a non-limiting representative example, the core 206 in the containerized cluster 200*b* comprises a pod 108*d* and a pod 108*e*. The pod 108*d* in the core 202 comprises a size 262 and cell IDs 146*m*-146*p*. The pod 108*d* in the core 202 comprises a size 264 and cell IDs 146*q*-146*s*. The pod 108*f* in the core 208 comprises a size 266 and cell IDs 146*t*-146*x*. The sizes 262-266 are shown to be different from one another. In this regard, each of the pods 108*d*-108*f* comprise a same number of network resources 107. In the example of FIG. 2B, the server 102 may be configured to assign network resources 107 corresponding to cells in the pods 108*d*-108*f*. In this regard, the server 102 is configured to assign the cells in accordance with the corresponding cell IDs 146*m*-146*x*. The cell IDs 146*m*-146*x* are representative of one or more cells. Herein, a number of the cell IDs 146*m*-146*x* indicate a number of resources assigned to a specific pod 108. The pod 108*d* is assigned the cell ID 146*m*, the cell ID 146*n*, the cell ID 1460, and the cell ID 146*p*. The pod 108*e* is assigned the cell ID 146*q*, the cell ID 146*r*, and the cell ID 146*s*. The pod 108*f* is assigned the cell ID 146*t*, the cell ID 146*u*, the cell ID 146*v*, the cell ID 146*w*, and the cell ID 146*x*.

In one or more embodiments, the pods 108*a*-108*c* may be created comprising the cell IDs 146*a*-146*l* as part of a first assignment 104. A second assignment 104 may shuffle the cell IDs 146*a*-146*l* in accordance with a second assignment 104 into new pods 108. The second assignment 104 may shuffle the cell IDs 146*a*-146*l* in accordance with the second assignment 104 into the pods 108*a*-108*c* while the communication system is online. In some embodiments, the first assignment 104 and/or the second assignment 104 may be implemented during a maintenance window. The maintenance window may be predefined or dynamically defined. In other embodiments, the first assignment 104 and/or the second assignment 104 may be implemented outside of a maintenance window.

Example Process to Dynamically Assign Cells to Pods

FIG. 3 illustrates an example flowchart of a process 300 to dynamically assign cells to pods 108, in accordance with one or more embodiments. In one or more embodiments, the process 300 comprises operations 302-332. Modifications, additions, or omissions may be made to the process 300. The process 300 may include more, fewer, or other operations than those shown below. For example, operations may be performed in parallel or in any suitable order. While at times discussed as the server 102, one or more of the user equipment 116, components of any of thereof, or any suitable system or components of the communication system 100 may perform one or more operations of the process 300. For example, one or more operations of the process 300 may be implemented, at least in part, in the form of server instructions 130 of FIG. 1, stored on non-transitory computer readable media, tangible media, machine-readable media (e.g., server memory 128 of FIG. 1 operating as a non-transitory computer readable medium) that when run by one or more processors (e.g., the server processor 120 of FIG. 1) may cause the one or more processors to perform operations described in operations 302-332 of the process 300. The process 300 may be perform during a maintenance window or outside a maintenance window.

The process 300 starts at operation 302, where the server 102 identifies one or more network resources 107. The server 102 may obtain information on one or more network resources 107 configured for allocation in one or more container clusters 162. At operation 304, the server 102 is configured to determine whether any of the network resources 107 are unassigned. The server 102 may be configured to identify that the network resources 107 are assigned to multiple cell IDs 146. In this case, the server 102 may be configured to unassign the network resources 107 from the cell IDs 146. At this stage, the server 102 may be configured to combine the network resources 107 into a group of unassigned network resources. If the server 102 determines that any of the network resources 107 are not unassigned (i.e., NO), the process 300 proceeds to operation 312. At operation 312, the server 102 determines that there are no network resources 107 available for assignment. If the server 102 determines that any of the network resources 107 are unassigned (i.e., YES), the process 300 proceeds to operation 322. At operation 322, the server 102 determines that the one or more network resources 107 are available for allocation to one or more cell IDs 146. In some embodiments, the server 102 may be configured to identify QoSs associated with one or more communication links.

The process 300 continues to operation 324, where the server 102 is configured to divide the one or more network resources 107 into a first group of network resources 107 and a second group of network resources 107. At operation 326, the server 102 is configured to assign the first group of network resources 107 to a first group of cell IDs 146. Herein, the network resources 107 may be divided based at least in part upon the QoSs identified. At operation 328, the server 102 is configured to assign the second group of network resources 107 to a second group of cell IDs 146.

In this case, the process 300 may conclude at operation 330 and operation 332. At operation 330, the server 102 is configured to generate a first pod 108 in one or more containerized clusters 162 comprising the first cell IDs 146. In this case, the first pod 108 may be updated and/or generated as a new pod 108 to comprise the first cell IDs 146. At operation 332, the server 102 is configured to generate a second pod 108 in one or more containerized clusters 162 comprising the second cell IDs 146. In this case, the second pod 108 may be updated and/or generated as a new pod 108 to comprise the second cell IDs 146. If updated, the first pod 108 and the second pod 108 may be updated outside of a maintenance window. If updated, the first pod 108 and the second pod 108 may be updated during a maintenance window.

Dynamic Assignment of Network Resources to Resource Pools in Pods

FIGS. 4A and 4B illustrate examples of container clusters 162 in accordance with one or more embodiments. In the example of FIG. 4A, a containerized cluster 400*a* is shown comprising a core 402 and a core 404 in a containerized environment. In the example of FIG. 4B, a containerized cluster 400*b* is shown comprising a core 406 and a core 408 in a containerized environment. Each of the cores 402-408 comprises at least one pod 108 and at least one resource pool 152. The pods 108*a*-108*d* are examples of possible pods 108 comprising resources 107 assigned during a maintenance window or outside a maintenance window. In this regard, FIG. 4A shows pods 108 of equal sizes 412 and 414, while FIG. 4B shows pods of different sizes 416 and 418. The pods 108*a*-108*d* comprise resource pools 152*a*-1521 comprising sizes 422-472. Further, the cores 402-408 may be configured to perform specific DL operations or UL operations. The DL core 402 and the DL core 406 may be configured to perform DL operations. The UL core 404 and the UL core 408 may be configured to perform UL operations. In some embodiments, the pods 108 are allocated in different order and/or different cores than those shown in FIGS. 2A and 2B.

In some embodiments, the server 102 is configured to keep some computing capacity in at least one resource pool 152 in a floating mode. The resource pools 152*a*-1521 may be scaled vertically and/or horizontally to support higher capacity during enterprise operations, mission critical operations in an organization, strict SLA use cases, and the like. In other embodiments, the resource pools 152*a*-1521 may be configured to enable multi-tenancy operations in the communication system 100 running analytics/MEC applications during off peak hours on a wireless communication network. The server 102 methods may be configured to perform energy savings at CRAN sites.

In one or more embodiments, the pods 108*a*-108*d* comprise examples of dynamically assigned network resources 107 to resource pools 152*a*-1521. In particular, the examples in FIGS. 4A and 4B comprise resource pools 152*a*-1521 with dynamically assigned network resources 107 in the pods 108*a*-108*d*. The pods 108*a*-108*d* may be associated with a CRAN. The server 102 are configured to dynamically redistribute and/or reassign the network resources 107 to the resource pools 152*a*-1521. In some embodiments, the server 102 may leverage cell redistribution into generating the resource pools 152*a*-1521 for physical layer applications in the CRAN. The pods 108*a*-108*d* may be configured to be deployed in a containerized environment (e.g., Kubernetes environment). The pods 108*a*-108*d* may comprise network resources 107 that are co-located and co-scheduled. The pods 108*a*-108*d* may be configured as redundancies of one another or as standalone portions of a wireless communication network. Herein, the pods 108*a*-108*d* may be created and/or resized to enable layer operations 132 comprising Layer 1 (L1) operations and Layer 2 (L2) operations. The server 102 may be configured to maintain a pool of floating resources for each layer. In this regard, the server 102 may be configured to create and maintain an L1 resource pool 152, an L2 resource pool 152, and a floating resource pool 152 configured to enable L1 operations and L2 operations. During off-peak hours, the server 102 may be configured to monitor utilization of the L1 resource pool 152, the L2 resource pool 152, and the floating resource pool 152 and determining whether to resize the resource pools 152 to optimize usage of the network resources 107.

In the example of FIG. 4A, as a non-limiting representative example, the DL core 402 in the containerized cluster 400*a* comprises the DL pod 108*a* and the UL pod 108*b*. The DL pod 108*a* in the core 402 comprises a size 412 and resource pools 152*a*-152*c*. The resource pool 152*a* comprises a size 422. The resource pool 152*b* comprises a size 424. The resource pool 152*c* comprises a size 426. In the containerized cluster 400*a*, as a non-limited example, the sizes 422-426 are shown to be equal to one another. The UL pod 108*b* in the core 404 comprises a size 414 and resource pools 152*a*-152*c*. The resource pool 152*d* comprises a size 428. The resource pool 152*e* comprises a size 430. The resource pool 152*f* comprises a size 432. In the containerized cluster 400*a*, as a non-limited example, the sizes 428-432 are shown to be equal to one another.

In the example of FIG. 4B, as a non-limiting representative example, the DL core 406 in the containerized cluster 400*b* comprises the DL pod 108*c* and the UL pod 108*d*. The DL pod 108*c* in the core 406 comprises a size 416 and resource pools 152*g*-152*i*. The resource pool 152*g* comprises a size 462. The resource pool 152*h* comprises a size 464. The resource pool 152*i* comprises a size 466. In the containerized cluster 400*b*, the sizes 462-466 are shown to be different to one another as a non-limited example. The UL pod 108*d* in the core 408 comprises a size 418 and resource pools 152*j*-1521. The resource pool 152*j* comprises a size 468. The resource pool 152*k* comprises a size 470. The resource pool 152*l* comprises a size 472. In the containerized cluster 400*b*, as a non-limited example, the sizes 468-472 are shown to be different to one another.

Example Process to Dynamically Assign Network Resources to Resource Pools in Pods FIG. 5 illustrates an example flowchart of a process 500 to dynamically assign network resources 107 to pods 108, in accordance with one or more embodiments. In one or more embodiments, the process 500 comprises operations 502-534. Modifications, additions, or omissions may be made to the process 500. The process 500 may include more, fewer, or other operations than those shown below. For example, operations may be performed in parallel or in any suitable order. While at times discussed as the server 102, one or more of the user equipment 116, components of any of thereof, or any suitable system or components of the communication system 100 may perform one or more operations of the process 500. For example, one or more operations of the process 500 may be implemented, at least in part, in the form of server instructions 130 of FIG. 1, stored on non-transitory computer readable media, tangible media, machine-readable media (e.g., server memory 128 of FIG. 1 operating as a non-transitory computer readable medium) that when run by one or more processors (e.g., the server processor 120 of FIG. 1) may cause the one or more processors to perform operations described in operations 502-534 of the process 500. The process 500 may be perform during a maintenance window or outside a maintenance window.

The process 500 starts at operation 502, where the server 102 identifies one or more network resources 107. The server 102 may obtain information on one or more network resources 107 configured for allocation in one or more container clusters 162. At operation 504, the server 102 is configured to determine whether any of the network resources 107 are unassigned. The server 102 may be configured to identify that the network resources 107 are assigned to multiple resource pools 152. In this case, the server 102 may be configured to unassign the network resources 107 from the resource pools 152. If the server 102 determines that any of the network resources 107 are not unassigned (i.e., NO), the process 500 proceeds to operation 512. At operation 512, the server 102 determines that there are no network resources 107 available for assignment. If the server 102 determines that any of the network resources 107 are unassigned (i.e., YES), the process 500 proceeds to operation 522. At operation 522, the server 102 determines that the one or more network resources 107 are available for allocation to one or more resource pools 152.

The process 500 continues to operation 524, where the server 102 is configured to determine a first group of network resources 107 configured to enable first layer operations 132. At operation 526, the server 102 is configured to determine a second group of network resources 107 configured to enable second layer operations 132. The first layer operations 132 and the second layer operations 132 may be same or different operations. The first layer operations 132 may comprise L1 operations, L2 operations, or a combination of L1 operations and L2 operations. The second layer operations 132 may comprise L1 operations, L2 operations, or a combination of L1 operations and L2 operations.

In this case, the process 300 may conclude at operations 528-534. At operation 528, the server 102 is configured to assign the first group of network resources 107 to a first resource pool 152*a*. At operation 530, the server 102 is configured to assign the second group of network resources 107 to a second resource pool 152*b*. At operation 532, the server 102 is configured to generate a first pod 108 in one or more containerized clusters 162 comprising the first resource pool 152*a*. In this case, the first pod 108 may be updated and/or generated as a new pod 108 to comprise the first resource pool 152*a*. At operation 534, the server 102 is configured to generate a second pod 108 in one or more containerized clusters 162 comprising the second resource pool 152*b*. In this case, the second pod 108 may be updated and/or generated as a new pod 108 to comprise the second resource pool 152*b*.

Dynamic Assignment of Network Resources to Slices in Pods

FIG. 6 illustrates an example of a container clusters 162 in accordance with one or more embodiments. In the example of FIG. 6, a containerized cluster 600 is shown comprising a core 602 and a core 604 in a containerized environment. Each of the cores 602 and 604 comprises at least one pod 108 and at least one resource pool 152. The pods 108*a* and 108*b* are examples of possible pods 108 comprising resources assigned during a maintenance window or outside a maintenance window. The pods 108*a* and 108*b* may comprise same or different sizes. In some embodiments, the pods 108 are allocated in different order and/or different cores than those shown in FIG. 6.

In FIG. 6, as a non-limiting representative example, the cores 602 and 604 in the containerized cluster 600 comprise a pod 108*a* and a pod 108*b*, respectively. The pod 108*a* in the core 602 comprises slices 612-616 across the resource pool 152*a* and the resource pool 152*b*. The pod 108*b* in the core 604 comprises slices 618-622 across the resource pools 152*c* and the resource pools 152*d*.

In one or more embodiments, the pods 108*a* and 108*b* comprise slices 612-622 with dynamically assigned network resources 107. In particular, the pods 108*a* and 108*b* comprise resource pools 152*a*-152*d* associated with a platform and infrastructure layer. The server 102 may be configured to redistribute and/or reassign the network resources 107 to the network slices 612-622. In some embodiments, the server 102 dynamically allocates the network resources 107 into the network slices 612-622 in accordance with one or more configuration parameters that may include: SLA considerations, general organization rules and policies, or emergency procedures. The slices 612-622 may be configured as quick access to the network resources 107 in the individual pods 108*a* and 108*b*. The network resources 107 may be accessed without interfering with a rest of operations in a wireless communication network. Herein, the network resources 107 may be accessed to experience communication with higher priority and QoS. As described above, the slices 612-622 may correspond to one or more slice group IDs 148.

Example Process to Dynamically Assign Network Resources to Slices in Pods

FIG. 7 show an example flowchart of a process 700 to dynamically assign network resources 107 to pods 108, in accordance with one or more embodiments. In one or more embodiments, the process 700 comprises operations 702-734. Modifications, additions, or omissions may be made to the process 700. The process 700 may include more, fewer, or other operations than those shown below. For example, operations may be performed in parallel or in any suitable order. While at times discussed as the server 102, one or more of the user equipment 116, components of any of thereof, or any suitable system or components of the communication system 100 may perform one or more operations of the process 700. For example, one or more operations of the process 700 may be implemented, at least in part, in the form of server instructions 130 of FIG. 1, stored on non-transitory computer readable media, tangible media, machine-readable media (e.g., server memory 128 of FIG. 1 operating as a non-transitory computer readable medium) that when run by one or more processors (e.g., the server processor 120 of FIG. 1) may cause the one or more processors to perform operations described in operations 702-734 of the process 700.

The process 700 starts at operation 702, where the server 102 identifies one or more network resources 107. The server 102 may obtain information on one or more network resources 107 configured for allocation in one or more container clusters 162. At operation 704, the server 102 is configured to determine whether any of the network resources 107 are unassigned. The server 102 may be configured to identify that the network resources 107 are assigned to multiple slice group IDs 148. In this case, the server 102 may be configured to unassign the network resources 107 from the cell IDs 146. At this stage, the server 102 may be configured to combine the network resources 107 into a group of unassigned network resources. If the server 102 determines that any of the network resources 107 are not unassigned (i.e., NO), the process 700 proceeds to operation 712. At operation 712, the server 102 determines that there are no network resources 107 available for assignment. If the server 102 determines that any of the network resources 107 are unassigned (i.e., YES), the process 700 proceeds to operation 722. At operation 722, the server 102 determines that the one or more network resources 107 are available for allocation to one or more resource pools 152.

The process 700 continues to operation 724, where the server 102 is configured to determine a first group of network resources 107 configured to enable first layer operations 132. At operation 726, the server 102 is configured to determine a second group of network resources 107 configured to enable second layer operations 132. At operation 728, the server 102 is configured to generate a first pod 108 in one or more containerized clusters 162 comprising the first resource pool 152*a*. At operation 730, the server 102 is configured to generate a second pod 108 in one or more containerized clusters 162 comprising the second resource pool 152*b*.

In this case, the process 700 may conclude at operation 732 and operation 734. At operation 732, the server 102 is configured to assign a first slice group ID 148 configured to access at least one slice (one of slices 612-622) of the first resource pool 152*a* to the first pod 108. In this case, the first pod 108 may be updated and/or generated as a new pod 108 to comprise the first resource pool 152*a*. At operation 734, the server 102 is configured to assign a second slice group ID 148 configured to access at least one slice (one of slices 612-622) of the second resource pool 152*a* to the first pod 108. In this case, the second pod 108 may be updated and/or generated as a new pod 108 to comprise the second resource pool 152*b*.

SCOPE OF THE DISCLOSURE

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An apparatus, comprising:

a memory, comprising:

information on one or more network resources configured for allocation in one or more containerized clusters; and one or more cell identifiers (IDs), each cell ID corresponding to at least one cell configured to be associated with at least one pod in the one or more containerized clusters; and a processor communicatively coupled to the memory and configured to:

determine whether the one or more network resources are unassigned;

in response to determining that the one or more network resources are unassigned, determine that the one or more network resources are available for allocation to the one or more cell IDs;

divide the one or more network resources into a first plurality of network resources and a second plurality of network resources;

assign the first plurality of network resources to a first plurality of cell IDs;

assign the second plurality of network resources to a second plurality of cell IDs;

generate a first pod in one or more containerized clusters comprising the first plurality of cell IDs;

generate a second pod in the one or more containerized clusters comprising the second plurality of cell IDs; and redistribute the assigned first plurality of network resources and the assigned second plurality of network resources between the first pod and the second pod during a maintenance window.

2. The apparatus of claim 1, wherein the processor is further configured to:

during the maintenance window, identify the first plurality of network resources assigned to the first plurality of cell IDs and the second plurality of network resources assigned to the second plurality of cell IDs;

unassign the first plurality of network resources from the first plurality of cell IDs;

unassign the second plurality of network resources from the second plurality of cell IDs;

combine the first plurality of network resources and the second plurality of network resources into a plurality of unassigned network resources;

determine that the plurality of unassigned network resources are available for reallocation to a third plurality of cell IDs and a fourth plurality of cell IDs;

divide the plurality of unassigned network resources into a third plurality of network resources and a fourth plurality of network resources;

assign the third plurality of network resources to the third plurality of cell IDs;

assign the fourth plurality of network resources to the fourth plurality of cell IDs;

generate a third pod in the one or more containerized clusters comprising the third plurality of cell IDs;

generate a fourth pod in the one or more containerized clusters comprising the fourth plurality of cell IDs; and deactivate the first pod and the second pod.

3. The apparatus of claim 1, wherein the processor is further configured to:

identify the first plurality of network resources assigned to the first plurality of cell IDs and the second plurality of network resources assigned to the second plurality of cell IDs;

unassign the first plurality of network resources from the first plurality of cell IDs;

unassign the second plurality of network resources from the second plurality of cell IDs;

combine the first plurality of network resources and the second plurality of network resources into a plurality of unassigned network resources;

determine that the plurality of unassigned network resources are available for reallocation to the first plurality of cell IDs and the second plurality of cell IDs;

divide the plurality of unassigned network resources into a third plurality of network resources and a fourth plurality of network resources;

assign the third plurality of network resources to the first plurality of cell IDs;

assign the fourth plurality of network resources to the second plurality of cell IDs;

update the first pod in the one or more containerized clusters comprising the first plurality of cell IDs; and update the second pod in the one or more containerized clusters comprising the second plurality of cell IDs.

4. The apparatus of claim 1, wherein the processor is further configured to:

identify the first plurality of network resources assigned to the first plurality of cell IDs and the second plurality of network resources assigned to the second plurality of cell IDs;

unassign the first plurality of network resources from the first plurality of cell IDs;

unassign the second plurality of network resources from the second plurality of cell IDs;

combine the first plurality of network resources and the second plurality of network resources into a plurality of unassigned network resources;

determine that the plurality of unassigned network resources are available for reallocation to a third plurality of cell IDs, a fourth plurality of cell IDs, a fifth plurality of cell IDs, and a sixth plurality of cell IDs;

identify a plurality of services associated with one or more tenant profiles, the plurality of services comprises a first service, a second service, a third service, and a fourth service;

associate a third plurality of network resources with the first service;

associate a fourth plurality of network resources with the second service;

associate a fifth plurality of network resources with the third service;

associate a sixth plurality of network resources with the fourth service;

assign the third plurality of network resources to the third plurality of cell IDs;

assign the fourth plurality of network resources to the fourth plurality of cell IDs;

assign the fifth plurality of network resources to the fifth plurality of cell IDs;

assign the sixth plurality of network resources to the sixth plurality of cell IDs;

generate a third pod in the one or more containerized clusters comprising the third plurality of cell IDs and the fifth plurality of cell IDs; and generate a fourth pod in the one or more containerized clusters comprising the fourth plurality of cell IDs and the sixth plurality of cell IDs, wherein the third pod and the fourth pod comprise a same size.

5. The apparatus of claim 1, wherein the processor is further configured to:

identify the first plurality of network resources assigned to the first plurality of cell IDs and the second plurality of network resources assigned to the second plurality of cell IDs;

unassign the first plurality of network resources from the first plurality of cell IDs;

unassign the second plurality of network resources from the second plurality of cell IDs;

combine the first plurality of network resources and the second plurality of network resources into a plurality of unassigned network resources;

determine that the plurality of unassigned network resources are available for reallocation to a third plurality of cell IDs, a fourth plurality of cell IDs, a fifth plurality of cell IDs, and a sixth plurality of cell IDs;

identify a plurality of quality of services (QoSs) associated with one or more communication links, the plurality of QoSs comprises a first QoS for a first communication link, a second QoS for a second communication link, a third QoS for a third communication link, and a fourth QoS for a fourth communication link;

determine a third plurality of network resources for the first communication link based at least in part upon the first QoS;

determine a fourth plurality of network resources for the second communication link based at least in part upon the second QoS;

determine a fifth plurality of network resources for the third communication link based at least in part upon the third QoS;

determine a sixth plurality of network resources for the fourth communication link based at least in part upon the fourth QoS;

assign the third plurality of network resources to the third plurality of cell IDs based at least in part upon the first QoS;

assign the fourth plurality of network resources to the fourth plurality of cell IDs based at least in part upon the second QoS;

assign the fifth plurality of network resources to the fourth plurality of cell IDs based at least in part upon the third QoS;

assign the sixth plurality of network resources to the sixth plurality of cell IDs based at least in part upon the fourth QoS;

generate a third pod in the one or more containerized clusters comprising the third plurality of cell IDs and the fifth plurality of cell IDs; and generate a fourth pod in the one or more containerized clusters comprising the fourth plurality of cell IDs and the sixth plurality of cell IDs, wherein the third pod and the fourth pod comprise a same size.

6. The apparatus of claim 1, wherein the processor is further configured to:

identify the first plurality of network resources assigned to the first plurality of cell IDs and the second plurality of network resources assigned to the second plurality of cell IDs;

unassign the first plurality of network resources from the first plurality of cell IDs;

unassign the second plurality of network resources from the second plurality of cell IDs;

combine the first plurality of network resources and the second plurality of network resources into a plurality of unassigned network resources;

determine that the plurality of unassigned network resources are available for reallocation to a third plurality of cell IDs, a fourth plurality of cell IDs, and a fifth plurality of cell IDs;

divide the plurality of unassigned network resources into a third plurality of network resources, a fourth plurality of network resources, and a fifth plurality of network resources;

assign the third plurality of network resources to the third plurality of cell IDs;

assign the fourth plurality of network resources to the fourth plurality of cell IDs;

assign the fifth plurality of network resources to the fifth plurality of cell IDs;

generate a third pod in the one or more containerized clusters comprising the third plurality of cell IDs;

generate a fourth pod in the one or more containerized clusters comprising the fourth plurality of cell IDs; and generate a fifth pod in the one or more containerized clusters comprising the fifth plurality of cell IDs.

7. A method, comprising:

determining whether one or more network resources are unassigned, the one or more network resources being configured for allocation in one or more containerized clusters;

in response to determining that the one or more network resources are unassigned, determining that the one or more network resources are available for allocation to one or more cell identifiers (IDs), each cell ID of the one or more cell IDs corresponding to at least one cell configured to be associated with at least one pod in the one or more containerized clusters;

dividing the one or more network resources into a first plurality of network resources and a second plurality of network resources;

assigning the first plurality of network resources to a first plurality of cell IDs;

assigning the second plurality of network resources to a second plurality of cell IDs;

generating a first pod in the one or more containerized clusters comprising the first plurality of cell IDs;

generating a second pod in the one or more containerized clusters comprising the second plurality of cell IDs; and redistributing the assigned first plurality of network resources and the assigned second plurality of network resources between the first pod and the second pod during a maintenance window to symmetrically utilize the network resources.

8. The method of claim 7, further comprising:

during the maintenance window, identifying the first plurality of network resources assigned to the first plurality of cell IDs and the second plurality of network resources assigned to the second plurality of cell IDs;

unassigning the first plurality of network resources from the first plurality of cell IDs;

unassigning the second plurality of network resources from the second plurality of cell IDs;

combining the first plurality of network resources and the second plurality of network resources into a plurality of unassigned network resources;

determining that the plurality of unassigned network resources are available for reallocation to a third plurality of cell IDs and a fourth plurality of cell IDs;

dividing the plurality of unassigned network resources into a third plurality of network resources and a fourth plurality of network resources;

assigning the third plurality of network resources to the third plurality of cell IDs;

assigning the fourth plurality of network resources to the fourth plurality of cell IDs;

generating a third pod in the one or more containerized clusters comprising the third plurality of cell IDs;

generating a fourth pod in the one or more containerized clusters comprising the fourth plurality of cell IDs; and deactivating the first pod and the second pod.

9. The method of claim 7, further comprising:

identifying the first plurality of network resources assigned to the first plurality of cell IDs and the second plurality of network resources assigned to the second plurality of cell IDs;

unassigning the first plurality of network resources from the first plurality of cell IDs;

unassigning the second plurality of network resources from the second plurality of cell IDs;

combining the first plurality of network resources and the second plurality of network resources into a plurality of unassigned network resources;

determining that the plurality of unassigned network resources are available for reallocation to the first plurality of cell IDs and the second plurality of cell IDs;

dividing the plurality of unassigned network resources into a third plurality of network resources and a fourth plurality of network resources;

assigning the third plurality of network resources to the first plurality of cell IDs;

assigning the fourth plurality of network resources to the second plurality of cell IDs;

updating the first pod in the one or more containerized clusters comprising the first plurality of cell IDs; and updating the second pod in the one or more containerized clusters comprising the second plurality of cell IDs.

10. The method of claim 7, further comprising:

identifying the first plurality of network resources assigned to the first plurality of cell IDs and the second plurality of network resources assigned to the second plurality of cell IDs;

unassigning the first plurality of network resources from the first plurality of cell IDs;

unassigning the second plurality of network resources from the second plurality of cell IDs;

combining the first plurality of network resources and the second plurality of network resources into a plurality of unassigned network resources;

determining that the plurality of unassigned network resources are available for reallocation to a third plurality of cell IDs, a fourth plurality of cell IDs, a fifth plurality of cell IDs, and a sixth plurality of cell IDs;

identifying a plurality of services associated with one or more tenant profiles, the plurality of services comprises a first service, a second service, a third service, and a fourth service;

associating a third plurality of network resources with the first service;

associating a fourth plurality of network resources with the second service;

associating a fifth plurality of network resources with the third service;

associating a sixth plurality of network resources with the fourth service;

assigning the third plurality of network resources to the third plurality of cell IDs;

assigning the fourth plurality of network resources to the fourth plurality of cell IDs;

assigning the fifth plurality of network resources to the fifth plurality of cell IDs;

assigning the sixth plurality of network resources to the sixth plurality of cell IDs;

generating a third pod in the one or more containerized clusters comprising the third plurality of cell IDs and the fifth plurality of cell IDs; and generating a fourth pod in the one or more containerized clusters comprising the fourth plurality of cell IDs and the sixth plurality of cell IDs, wherein the third pod and the fourth pod comprise a same size.

11. The method of claim 7, further comprising:

identifying the first plurality of network resources assigned to the first plurality of cell IDs and the second plurality of network resources assigned to the second plurality of cell IDs;

unassigning the first plurality of network resources from the first plurality of cell IDs;

unassigning the second plurality of network resources from the second plurality of cell IDs;

combining the first plurality of network resources and the second plurality of network resources into a plurality of unassigned network resources;

determining that the plurality of unassigned network resources are available for reallocation to a third plurality of cell IDs, a fourth plurality of cell IDs, a fifth plurality of cell IDs, and a sixth plurality of cell IDs;

identifying a plurality of quality of services (QoSs) associated with one or more communication links, the plurality of QoSs comprises a first QoS for a first communication link, a second QoS for a second communication link, a third QoS for a third communication link, and a fourth QoS for a fourth communication link;

determining a third plurality of network resources for the first communication link based at least in part upon the first QoS;

determining a fourth plurality of network resources for the second communication link based at least in part upon the second QoS;

determining a fifth plurality of network resources for the third communication link based at least in part upon the third QoS;

determining a sixth plurality of network resources for the fourth communication link based at least in part upon the fourth QoS;

assigning the third plurality of network resources to the third plurality of cell IDs based at least in part upon the first QoS;

assigning the fourth plurality of network resources to the fourth plurality of cell IDs based at least in part upon the second QoS;

assigning the fifth plurality of network resources to the fourth plurality of cell IDs based at least in part upon the third QoS;

assigning the sixth plurality of network resources to the sixth fourth plurality of cell IDs based at least in part upon the fourth QoS;

generating a third pod in the one or more containerized clusters comprising the third plurality of cell IDs and the fifth plurality of cell IDs; and generating a fourth pod in the one or more containerized clusters comprising the fourth plurality of cell IDs and the sixth plurality of cell IDs, wherein the third pod and the fourth pod comprise a same size.

12. The method of claim 7, further comprising:

identifying the first plurality of network resources assigned to the first plurality of cell IDs and the second plurality of network resources assigned to the second plurality of cell IDs;

unassigning the first plurality of network resources from the first plurality of cell IDs;

unassigning the second plurality of network resources from the second plurality of cell IDs;

combining the first plurality of network resources and the second plurality of network resources into a plurality of unassigned network resources;

determining that the plurality of unassigned network resources are available for reallocation to a third plurality of cell IDs, a fourth plurality of cell IDs, and a fifth plurality of cell IDs;

dividing the plurality of unassigned network resources into a third plurality of network resources, a fourth plurality of network resources, and a fifth plurality of network resources;

assigning the third plurality of network resources to the third plurality of cell IDs;

assigning the fourth plurality of network resources to the fourth plurality of cell IDs;

assigning the fifth plurality of network resources to the fifth plurality of cell IDs;

generating a third pod in the one or more containerized clusters comprising the third plurality of cell IDs;

generating a fourth pod in the one or more containerized clusters comprising the fourth plurality of cell IDs; and generating a fifth pod in the one or more containerized clusters comprising the fifth plurality of cell IDs.

13. A non-transitory computer-readable medium storing instructions that when executed by a processor cause the processor to:

determine whether one or more network resources are unassigned, the one or more network resources being configured for allocation in one or more containerized clusters;

in response to determining that the one or more network resources are unassigned, determine that the one or more network resources are available for allocation to one or more cell identifiers (IDs), each cell ID of the one or more cell IDs corresponding to at least one cell configured to be associated with at least one pod in the one or more containerized clusters;

divide the one or more network resources into a first plurality of network resources and a second plurality of network resources;

assign the first plurality of network resources to a first plurality of cell IDs;

assign the second plurality of network resources to a second plurality of cell IDs;

generate a first pod in the one or more containerized clusters comprising the first plurality of cell IDs;

generate a second pod in the one or more containerized clusters comprising the second plurality of cell IDs; and redistribute the assigned first plurality of network resources and the assigned second plurality of network resources between the first pod and the second pod during a maintenance window to symmetrically utilize the network resources.

14. The non-transitory computer-readable medium of claim 13, the processor being further caused to:

during the maintenance window, identify the first plurality of network resources assigned to the first plurality of cell IDs and the second plurality of network resources assigned to the second plurality of cell IDs;

unassign the first plurality of network resources from the first plurality of cell IDs;

unassign the second plurality of network resources from the second plurality of cell IDs;

combine the first plurality of network resources and the second plurality of network resources into a plurality of unassigned network resources;

determine that the plurality of unassigned network resources are available for reallocation to a third plurality of cell IDs and a fourth plurality of cell IDs;

divide the plurality of unassigned network resources into a third plurality of network resources and a fourth plurality of network resources;

assign the third plurality of network resources to the third plurality of cell IDs;

assign the fourth plurality of network resources to the fourth plurality of cell IDs;

generate a third pod in the one or more containerized clusters comprising the third plurality of cell IDs;

generate a fourth pod in the one or more containerized clusters comprising the fourth plurality of cell IDs; and deactivate the first pod and the second pod.

* * * * *